(12) United States Patent
Tulek et al.

(10) Patent No.: US 9,053,484 B1
(45) Date of Patent: *Jun. 9, 2015

(54) COMPUTER IMPLEMENTED SYSTEM FOR FORMING AN ACCELERATED COMPLIANCE PLAN WITH A GRAPHIC VISUALIZATION

(71) Applicant: ACCESS SCIENCES CORPORATION, Houston, TX (US)

(72) Inventors: Anne Genevieve Tulek, Houston, TX (US); Janice Carver Anderson, Houston, TX (US); Jennifer Christian Greer, Houston, TX (US); Claudette Landry Lloyd, Houston, TX (US); Ali Guray Tulek, Houston, TX (US)

(73) Assignee: ACCESS SCIENCES CORPORATION, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/547,094

(22) Filed: Nov. 18, 2014

Related U.S. Application Data

(60) Provisional application No. 61/905,826, filed on Nov. 18, 2013.

(51) Int. Cl.
| | |
|---|---|
| *G06Q 30/00* | (2012.01) |
| *G06T 11/20* | (2006.01) |
| *G06F 17/30* | (2006.01) |
| *G06F 3/06* | (2006.01) |

(52) U.S. Cl.
CPC ............ *G06Q 30/018* (2013.01); *G06T 11/206* (2013.01); *G06F 17/30085* (2013.01); *G06F 17/30126* (2013.01); *G06F 3/0649* (2013.01)

(58) Field of Classification Search
CPC ................ G06Q 30/018; G06T 11/206; G06F 17/30085; G06F 17/30126; G06F 3/0649
See application file for complete search history.

(56) References Cited

U.S. PATENT DOCUMENTS

| | | | |
|---|---|---|---|
| 7,225,247 B2 | 5/2007 | Kennedy et al. | |
| 7,330,536 B2 * | 2/2008 | Claudatos et al. ............. | 379/68 |
| 7,478,096 B2 | 1/2009 | Margolus et al. | |
| 7,502,891 B2 | 3/2009 | Shachor | |
| 7,512,636 B2 | 3/2009 | Verma et al. | |
| 7,680,830 B1 * | 3/2010 | Ohr et al. ................... | 707/999.2 |
| 7,703,125 B2 | 4/2010 | Motoyama | |
| 7,792,945 B2 | 9/2010 | Paknad et al. | |
| 7,933,860 B2 * | 4/2011 | Asselstine et al. ................ | 726/1 |
| 2002/0010708 A1 | 1/2002 | McIntosh | |

(Continued)

OTHER PUBLICATIONS

Peterson, Zachary, and Randal Burns. "Ext3cow: a time-shifting file system for regulatory compliance." ACM Transactions on Storage (TOS) 1.2 (2005): 190-212.*

"Records Management Best Practices Guide", Iron Mountain, 28 total pages, Jan. 2005.

(Continued)

*Primary Examiner* — Neveen Abel Jalil
*Assistant Examiner* — Kristofer Biskeborn
(74) *Attorney, Agent, or Firm* — Buskop Law Group, PC; Wendy Buskop

(57) ABSTRACT

A computer implemented system for forming an accelerated compliance plan with a plurality of graphic visualization indicators, markers, and displays. The system uses a database of regulatory compliance information relative to records retention which can be updated as regulations change to generate a plan that can be verified for compliance with regulations and has visual markers that show the updates quickly and easily.

24 Claims, 16 Drawing Sheets

(56) References Cited

U.S. PATENT DOCUMENTS

2002/0194014 A1    12/2002  Starnes et al.
2005/0053207 A1*    3/2005  Claudatos et al. ......... 379/88.22
2008/0270491 A1*   10/2008  Nowacki et al. ............. 707/204
2011/0093471 A1*    4/2011  Brockway et al. ............ 707/747
2011/0191145 A1*    8/2011  Ford et al. .................... 705/7.38

OTHER PUBLICATIONS

"Five Step to Record Retention Compliance", Parallax Consulting, 2006, 3 total pages, Michael Johngren.

Developing a Records Retention Program, from www.arma.org, 10 pages total, published in 1986.

* cited by examiner

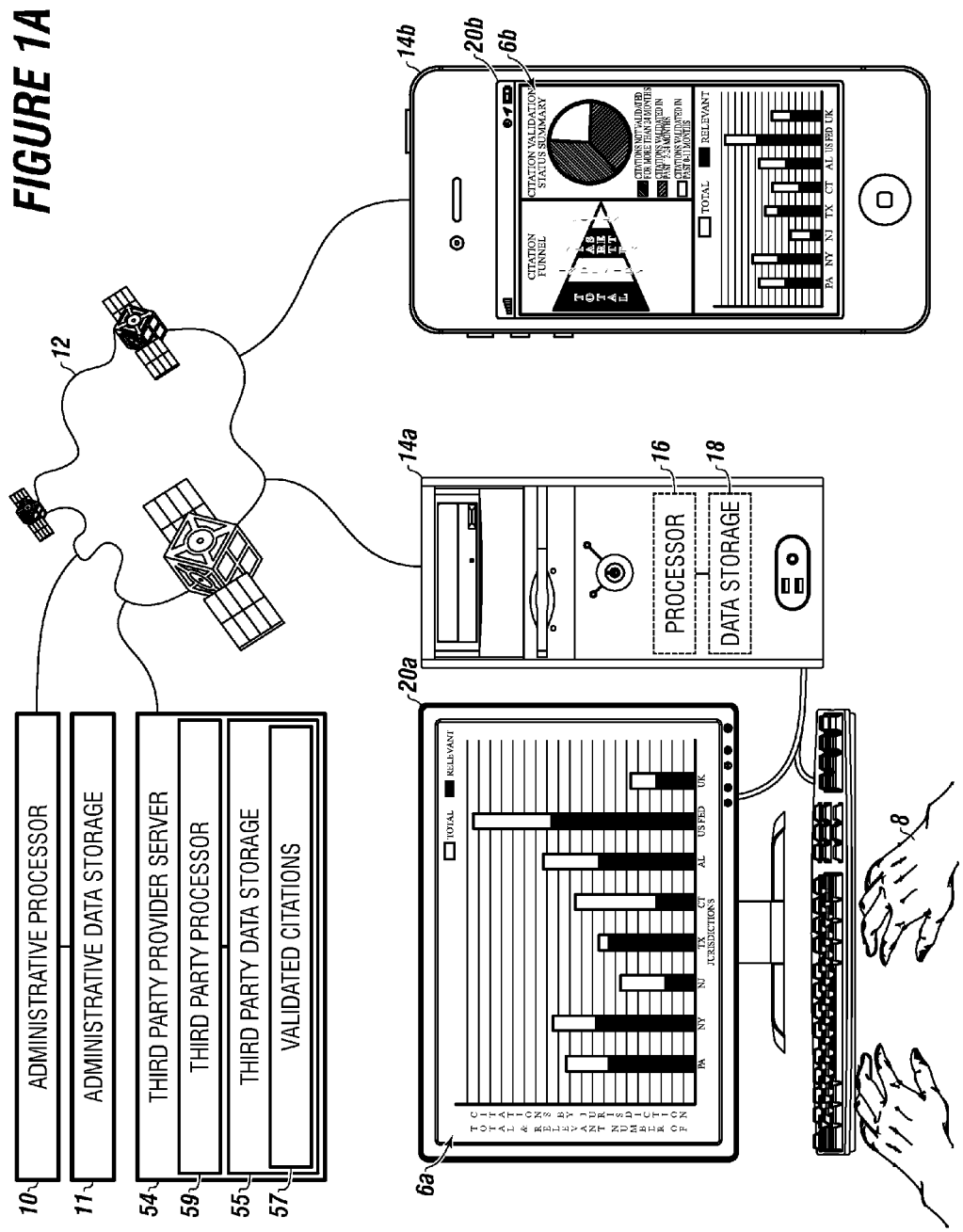

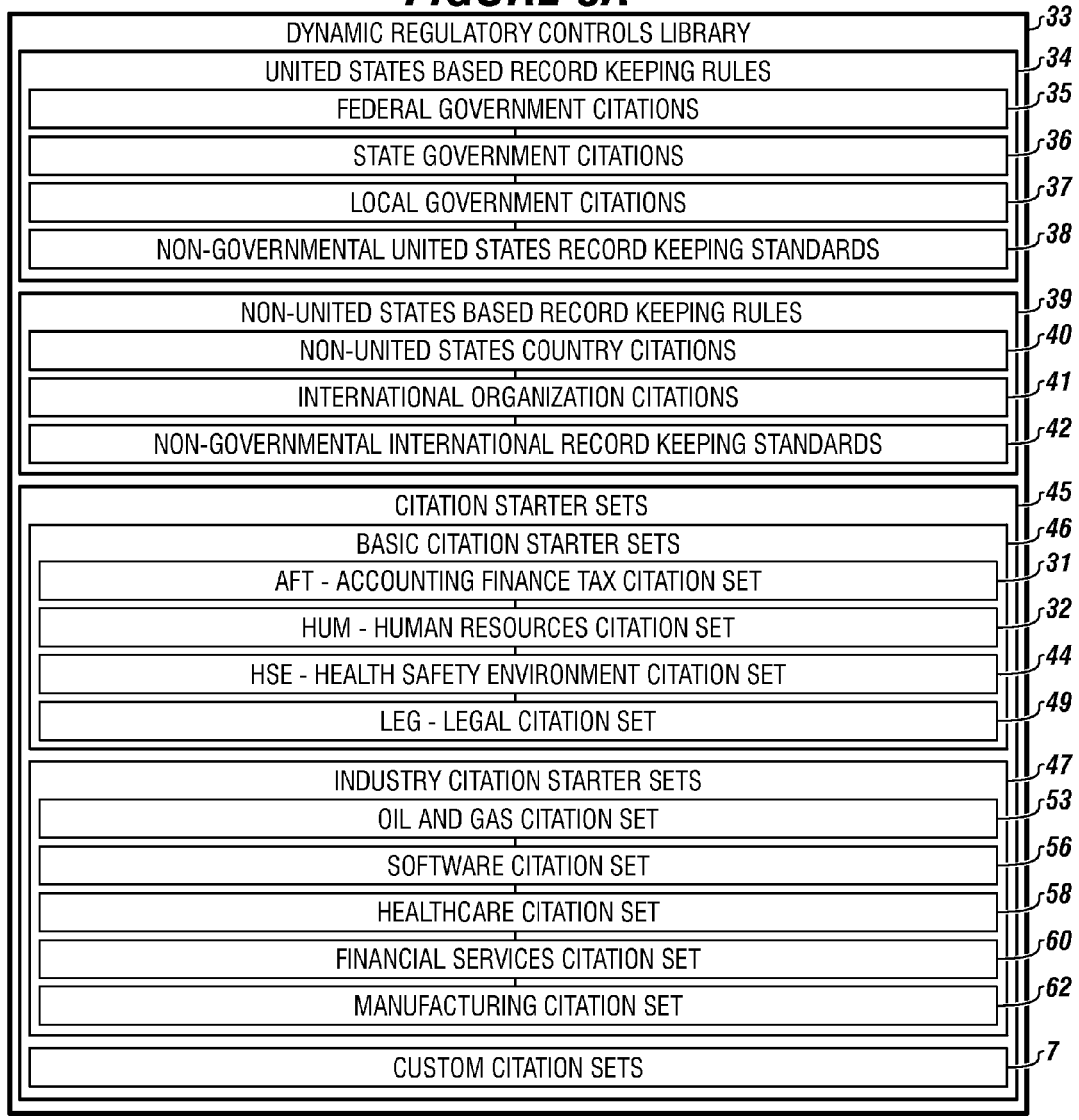

FIGURE 3A

| | |
|---|---|
| DYNAMIC REGULATORY CONTROLS LIBRARY | 33 |
| UNITED STATES BASED RECORD KEEPING RULES | 34 |
| FEDERAL GOVERNMENT CITATIONS | 35 |
| STATE GOVERNMENT CITATIONS | 36 |
| LOCAL GOVERNMENT CITATIONS | 37 |
| NON-GOVERNMENTAL UNITED STATES RECORD KEEPING STANDARDS | 38 |
| NON-UNITED STATES BASED RECORD KEEPING RULES | 39 |
| NON-UNITED STATES COUNTRY CITATIONS | 40 |
| INTERNATIONAL ORGANIZATION CITATIONS | 41 |
| NON-GOVERNMENTAL INTERNATIONAL RECORD KEEPING STANDARDS | 42 |
| CITATION STARTER SETS | 45 |
| BASIC CITATION STARTER SETS | 46 |
| AFT - ACCOUNTING FINANCE TAX CITATION SET | 31 |
| HUM - HUMAN RESOURCES CITATION SET | 32 |
| HSE - HEALTH SAFETY ENVIRONMENT CITATION SET | 44 |
| LEG - LEGAL CITATION SET | 49 |
| INDUSTRY CITATION STARTER SETS | 47 |
| OIL AND GAS CITATION SET | 53 |
| SOFTWARE CITATION SET | 56 |
| HEALTHCARE CITATION SET | 58 |
| FINANCIAL SERVICES CITATION SET | 60 |
| MANUFACTURING CITATION SET | 62 |
| CUSTOM CITATION SETS | 7 |

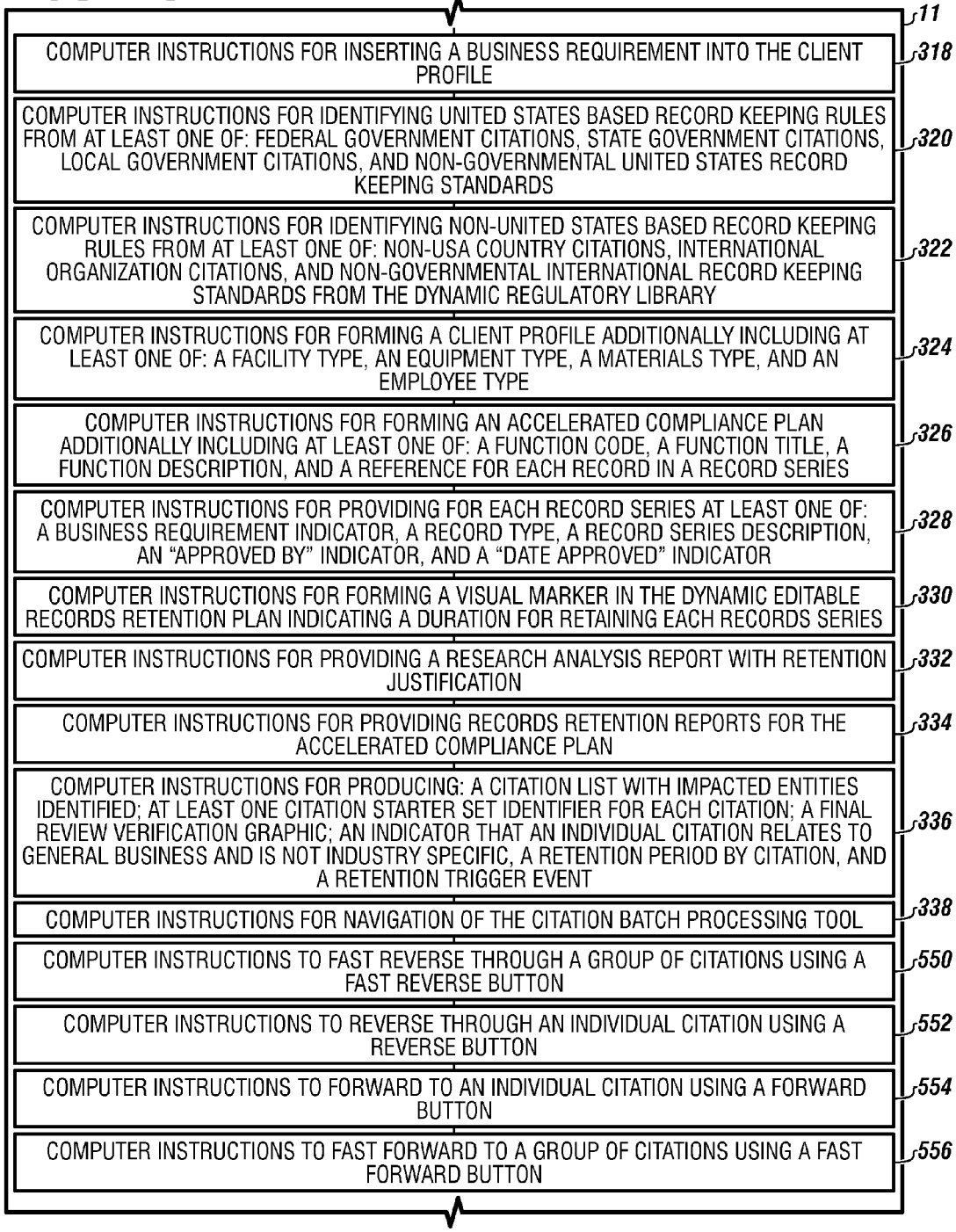

FIGURE 5C

| | |
|---|---|
| COMPUTER INSTRUCTIONS TO SEARCH FOR A SPECIFIC CITATION USING A SEARCH BUTTON | 558 |
| COMPUTER INSTRUCTIONS TO ADD A NEW CITATION USING A CITATION BUTTON | 560 |
| COMPUTER INSTRUCTIONS TO EDIT A CITATION USING AN EDIT BUTTON | 562 |
| COMPUTER INSTRUCTIONS TO UNDO A LAST ACTION USING AN UNDO BUTTON | 564 |
| COMPUTER INSTRUCTIONS TO DELETE A CITATION USING A DELETE BUTTON | 566 |
| COMPUTER INSTRUCTIONS TO SAVE WORK PERFORMED USING A SAVE BUTTON | 568 |
| COMPUTER INSTRUCTIONS TO EXIT A SCREEN USING AN EXIT BUTTON | 570 |
| COMPUTER INSTRUCTIONS TO PRINT AT LEAST ONE OF: A CITATION AND A CITATION SET USING A PRINT BUTTON | 572 |
| COMPUTER INSTRUCTIONS TO REVERSE THROUGH A RECORD SERIES USING A REVERSE BUTTON | 339 |
| COMPUTER INSTRUCTIONS TO FORWARD TO A RECORD IN A RECORD SERIES USING A FORWARD BUTTON | 340 |
| COMPUTER INSTRUCTIONS TO ADD A NEW RECORD USING A RECORD BUTTON | 341 |
| COMPUTER INSTRUCTIONS TO DELETE A RECORD USING A DELETE BUTTON | 342 |
| COMPUTER INSTRUCTIONS TO SAVE WORK PERFORMED USING A SAVE BUTTON | 343 |
| COMPUTER INSTRUCTIONS TO FAST REVERSE THROUGH A GROUP OF RECORDS IN A RECORD SERIES USING A FAST REVERSE BUTTON | 344 |
| COMPUTER INSTRUCTIONS TO FAST FORWARD TO A GROUP OF RECORDS IN A RECORD SERIES USING A FAST FORWARD BUTTON | 345 |
| COMPUTER INSTRUCTIONS TO SEARCH FOR A SPECIFIC RECORD USING A SEARCH BUTTON | 346 |
| COMPUTER INSTRUCTIONS TO EDIT A RECORD USING AN EDIT BUTTON | 347 |
| COMPUTER INSTRUCTIONS TO UNDO A LAST ACTION USING AN UNDO BUTTON | 348 |
| COMPUTER INSTRUCTIONS TO EXIT A SCREEN USING AN EXIT BUTTON | 349 |
| COMPUTER INSTRUCTIONS TO PRINT AT LEAST ONE OF: A RECORD AND A RECORD SERIES USING A PRINT BUTTON | 350 |
| COMPUTER INSTRUCTIONS TO REVERSE TO AN INDIVIDUAL CLIENT PROFILE USING A REVERSE BUTTON | 573 |
| COMPUTER INSTRUCTIONS TO FORWARD TO AN INDIVIDUAL CLIENT PROFILE USING A FORWARD BUTTON | 574 |
| COMPUTER INSTRUCTIONS TO ADD A NEW CLIENT PROFILE USING A RECORD BUTTON | 575 |
| COMPUTER INSTRUCTIONS TO DELETE A CLIENT PROFILE USING A DELETE BUTTON | 576 |
| COMPUTER INSTRUCTIONS TO SAVE WORK PERFORMED USING A SAVE BUTTON | 577 |

FIGURE 6

COMPUTER IMPLEMENTED SYSTEM FOR FORMING AN ACCELERATED COMPLIANCE PLAN WITH A GRAPHIC VISUALIZATION

CROSS REFERENCE TO RELATED APPLICATIONS

The current application claims priority to and the benefit of U.S. Provisional Patent Application Ser. No. 61/905,826 filed on Nov. 18, 2013, entitled "COMPUTER IMPLEMENTED SYSTEM FOR FORMING AN ACCELERATED DYNAMIC EDITABLE RECORDS RETENTION PLAN WITH A GRAPHIC VISUALIZATION". This reference is incorporated in its entirety.

FIELD

The present embodiments generally relate to a system for creating an accelerated compliance plan with a plurality of graphic visualization components associated with a plurality of legal citations sets and record series.

BACKGROUND

A need exists for a system that produces a computer implemented accelerated compliance plan which uses validated and predetermined citation sets rather than individual citations to identify records series quickly for enterprise records retention requirements.

A need exists for a system for forming a client specific editable records retention plan that is computer implemented and displays visual components on status of records, record series, citations and citation sets, retention dates for records, and applicable jurisdictions for compliances, all simultaneously.

The present embodiments meet this need.

BRIEF DESCRIPTION OF THE DRAWINGS

The detailed description will be better understood in conjunction with the accompanying drawings as follows:

FIG. 1A is an overview of the equipment usable to create an accelerated compliance plan with visual components using the computer instructions of the system.

FIG. 3A is a diagram of a portion of a dynamic regulatory controls library showing the United States Based Government Record Keeping Rules and Non-United States Based Record Keeping Rules, and starter citation sets used by the system.

FIGS. 5A-5D is a diagram of the administrative data storage usable by the system.

FIG. 6 depicts an add/edit citation set screen visually portraying many dynamic fields according to one or more embodiments.

Figure 1B:
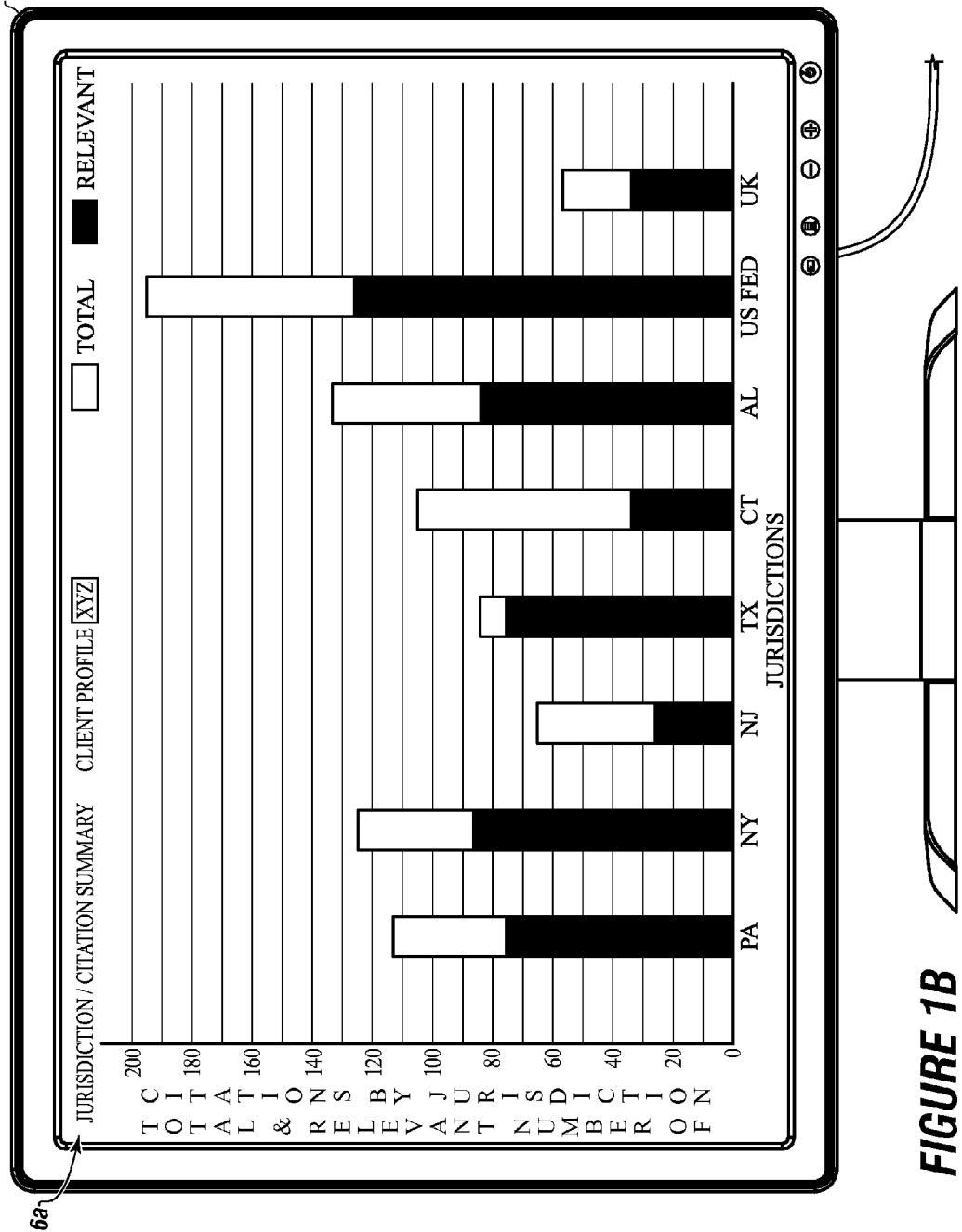
FIG. 1B depicts an exemplary visual component for a client profile of an accelerated compliance plan formed by the system showing a total number of relevant citations by jurisdiction.

The present embodiments are detailed below with reference to the listed Figures.

DETAILED DESCRIPTION OF THE EMBODIMENTS

Before explaining the present system in detail, it is to be understood that the invention is not limited to the particular embodiments and that it can be practiced or carried out in various ways.

A need exists for a system which allows for rapid implementation of a plan for compliance with records retention rules for various jurisdictions and industries. The system must address complex rules spanning various jurisdictions, industries, and triggering events in combination with continuously evolving requirements.

The present invention allows for an enterprise wide records retention system to be designed, validated, and implemented within an accelerated time frame.

A need exists for a fast, highly accurate system for creating a plan for records retention compliance that is dynamic, modifiable, contains validated information, and is capable of regular and frequent updates.

A need exists for a system that uses a database of regulatory compliance information relating to rules for records retention which can generate a plan that can be quickly and easily verified for compliance with regulations and has visual markers that show the updates easily.

The current system allows for the creation of an enterprise wide records retention system while providing enterprise wide information and metrics in consolidated graphical form.

The current system can make use of visual indications, graphs, charts, and color coding to highlight deficiencies in compliance, or potential defects in records retention procedures.

The system enables an organization to have reliable compliance with safety, security and environmental procedures, as well as provide essential data for governmental reporting.

The system provides clear and concise guidance about records which should be retained, duration to retain records, location of the records, and governing rules which are applicable to such procedures.

The system enables accelerated compliance with records retention rules, and provides an organizational records retention plan that is graphically viewable, updateable, validated for accuracy, and customizable.

The system is computer implemented using an administrative processor in communication with an administrative data storage and a network.

In embodiments, the administrative processor can be implemented in a distributed system architecture, such as various devices sharing resources in a computing cloud. Similarly, the administrative data storage can refer to one or more of a plurality of data storage units in communication with one or more processing units in the computing cloud.

Client devices can be in communication with the administrative processor through a network, such as a satellite network, the internet, a local area network, a wide area network, a corporate network, or the like.

The embodiments refer to a system forming an accelerated compliance plan with a graphic visualization component using an administrative processor in communication with an administrative data storage connected to a network to communicate with a plurality of client devices.

Each client device can have a client device processor, a client device data storage, and a client device display and can communicate with a third party provider server. The administrative processor and client devices can be computers, cell phones, tablets, or similar devices that can contain a processor with data storage and a display.

A third party provider server with a third party processor is connected to the network and to a third party data storage comprising validated citations to applicable laws, and governing regulations. Validated citations have been updated and verified for accuracy and content.

In the system, client files with a unique client file identifier can be formed. At least one client profile can be formed for each client file. Each client profile can have one or more dynamic editable fields.

The dynamic editable fields can comprise client characteristics such as: a client profile name, an industry type, a business activity, a jurisdiction, an operational location, a business requirement and a citation set field.

The system can have computer instructions causing the administrative processor to create and display navigational buttons, enabling a user to navigate through the dynamic editable fields of the client profile.

In the system, a dynamic regulatory controls library can be created maintained, wherein the dynamic regulatory controls library comprises citation starter sets applicable to various categories of businesses. Citation starter set can refer to basic citation starter sets, industry specific citation starter sets, custom citation sets, a source name, or combinations thereof.

The dynamic regulatory controls library can contain record keeping rules for various jurisdictions, as well as one or more citation starter sets.

Each citation starter set can have a plurality of citations. A key citation can be identified within the citation set as a critical or overriding citation regulating records retention. A key citation is a designated citation based upon criticality of the citation. A key citation is not required for a citation starter set.

Each of the citations can have a citation title, a source name, an impacted entity, an impacted records, a retention period, a full quote, a child quote, a citation set code, an industry type, a jurisdiction, a business activity, an operational location, a basic citation starter set code or an industry citation starter set code, and a key citation indicator.

The system can compare characteristics in the client profile to information stored in citation starter sets to determine citation starter sets with the greatest relevance to a specific client profile.

The system can make use of a citation batch processing tool with a citation filter. The citation batch processing tool can sort matched citations in the client profile by any selected characteristic, such as: source name, jurisdiction, operational location, business activity, industry type, citation set, and the like.

The citation batch processing tool with a citation filter can add and delete individual citations from matched citation starter sets to customize regulatory requirements for specific client profiles and form updated client profiles with associated citation sets.

The system can have a dynamic record series library which contains a plurality of record series of records needing to be maintained. Each record series can have associated information, such as a record series code, a function, a citation set, and the like.

The system can match the client profile with citation sets to at least one record series in the dynamic record series library, creating a matching record series.

The system can have computer instructions in the administrative data storage to identify the retention period for a key citation, if present, in each citation set.

If no key citation is identified in a citation set, the system can calculate the longest retention period cited for all citations in the citation set for each matched record series and then automatically propose a retention period for each matched record series.

When a plurality of key citations exist for a record series, the system can select the longest records retention period required by the key citations.

The system can connect to a third party provider server to import new citations absent from the matching record series. A first visual indicator can be created and displayed to graphically identify imported citations.

The system can have computer instructions in the administrative data storage to import citations absent from the accelerated compliance plan, delete invalid citations from the accelerated compliance plan, and display the imported or deleted citations on a client device.

Each time a connection to the third party provider server is performed, the system can use computer instructions in the administrative data storage to visually identify each citation in the dynamic regulatory controls library that is new, changed, validated or rejected during a selectable 24 month period.

The system can have computer instructions in the administrative data storage to insert a visual change marker into citations in the accelerated compliance plan each time a citation is new, changed, validated or rejected within 24 months of creation date of an accelerated compliance plan.

The system can calculate a retention period for all citations associated with each citation set in the accelerated compliance plan and provide a visual display of the results. The display can graphically consolidate data and rapidly allow a user to identify deficiencies or areas of concern.

The system can calculate an overall retention period for all the calculated retention periods for all citation sets and all records series, and provide enterprise wide metrics using graphic visualizations of record keeping rules on a display.

The term "accelerated compliance" as used herein can refer to a reduction in time required to achieve records retention compliance as compared to known systems. The amount of time is computed as the time a company requires to move from a state of non-compliance to a state of compliance in regards to the governing recordkeeping regulations.

The term "administrative processor" as used herein can refer to any commonly used computer processing device capable of performing the required computer operations.

The term "administrative data storage" as used herein can refer to computer readable storage media or any component used to store non transitory data for use by a computer processor.

The term "agencies or government" as used herein can refer to federal, state, county, city, town, province, parish, or similar governmental entities.

The term "citation starter set" as used herein can refer to one of a plurality of starter sets of citations. A citation starter set can be a citation set usable by any business and can be modified based on a client profile. The starter set can be created based on various jurisdictional regulations for a business work group function.

The term "business activity" as used herein can refer to at least one of a plurality of the actual activities of a business, such as manufacturing, or transportation, warehousing, retail sales, etc.

The term "business requirement" as used herein can refer to the possible inclusion of a retention requirement based on a non-regulatory rule. For example, if a company wishes to maintain records for periods longer than required by law.

The term "business retention" as used herein can refer to the years that an employee may need the business to keep a document to meet the employee's business requirements.

The term "child quote" as used herein can refer to a portion of a regulation or citation that is linked as a dependent or child to a parent regulation. For example if the parent quote is title is 49 CFR 395.13, and then the child quote would be a sub part within that parent quote.

The term "business retention period for a record series" as used herein can refer to the duration for which an organization's records must be kept as determined by the organization's management, regardless of whether the regulatory requirement is shorter.

The term "citation batch processing tool" as used herein can refer to a plurality of computer instructions which can batch process citations of the dynamic regulatory controls library individually or into citation sets using the client profile. The citation batch processing tool uses from the client profile, at least one of the following fields: industry type, business activity, jurisdiction, and citation sets which are in the client profile, such as the basic starter set, and an operational location.

The citation batch processing tool can contain computer instructions that add new citations using the client profile to the client profile or citation set, delete citations using the client profile from the client profile or citation set using the dynamic regulatory controls library.

The term "citation set" as used herein can refer to a group of citations that have been identified and linked to each other based on at least one of a jurisdiction, an industry type, a business activity of a particular client profile using computer instructions.

A citation set can be used to label a record series with a citation set code, each record series having at least one individual record. A citation set can use computer instructions to calculate a retention period compliant with all citations of the citation set which can then transfer to an overall records retention period for all records of the records series labeled with a citation set code.

The term "client device" as used herein can be a server, a computer, a laptop computer, or another personal digital device that can communicate to the network. Each client device has a processor and data storage which are configured to communicate with the network. Each client device has a client device display either built into the client device or connected to the client device processor, such as a monitor or screen to display the accelerated compliance plan visually.

The term "client file" as used herein can refer to the overall file of a customer which contains at least one client profile and in some embodiments, pluralities of client profiles. The client file can contain an overall client name for all client profiles, such as ABC Holding Company which has client profiles for ABC Equipment Company, and ABC Electrical Repair Company.

The term "client file identifier" as used herein can refer to a unique identifier which identifies the client file and enables the client file to be encoded or easily searchable.

The term "client profile" as used herein can refer to one or many client profiles that are in a client file, having dynamic editable fields including a client profile name, industry type, business activity, jurisdiction, operational location, and identified citation sets for the client profile.

The term "compliance information" as used herein can refer to a regulation or citation, in part, in whole, or in combinations thereof that provides guidance on recordkeeping.

The term "accelerated compliance plan" as used herein can refer to a records retention plan that provides retention dates for records series using citation sets and optionally providing a graphic visualization component, such as a flag, a color, or patterns of completeness, such as charts, or graphs for records retention by date, location, industry, and the like.

The term "dynamic regulatory controls library" as used herein can refer to a dynamic database of citations which can also be grouped into citation sets in the library. The library can include in database format, United States based governmental citations and non-United States based governmental citations as well as starter sets of citations.

The "dynamic regulatory controls library" can be a dynamic database of compliance regulations including but not limited to SEMS II, SPCC, RMP, SOX, OSHA or combinations thereof, as well as information lifecycle management tasks associated with the compliance regulations.

Some of the starter sets of citations in the dynamic regulatory controls library can be basic citation sets usable by all industries in a given operational location, and can also include at least one industry specific citation set.

The term "full quote" as used herein can refer to the entire text of a particular citation identified from a citation set, which could be a starter set of citations.

The term "function" as used herein can refer to the group of business activities that are related to similar tasks or transactions. For example, Human Resources is a function because it includes activities and transactions related to recruiting, hiring, and training employees.

The term "industry type" as used herein can refer to a type of industry for a given location of a customer, such as health care, oil and gas, software services, or financial services.

The term "industry citation starter set" as used herein can refer to a citation set that is specific to an industry type, such as oil and gas, or manufacture of computer chips. An industry citation starter set can be a citation set usable by a typical business within an industry type and may be modified based on a client profile. The industry citation starter set as an example can be created based on at least United States of America federal citations for records retention or non-United States based country record keeping rules for records retention, for an industry type.

The term "jurisdiction" as used herein can refer to the geographical area, industry, or business sector for which certain laws and regulations apply.

The term "management of a company" as used herein can refer to the president, vice president, other officers, boards of directors, human resources personnel or other members who are responsible and accountable for the company's compliance with laws, regulations and governmental requirements.

The term "navigational buttons" can be buttons that appear on a screen of the client device which enable connection to a function that allows a user to scroll forward, back, edit, save and exit the dynamic editable fields of each client profile.

The term "network" as used herein can refer to a global communication network, such as the internet, another global communication network, a cellular network, a satellite network, a similar network with communication capabilities, or combinations thereof.

The term "new compliance regulations for records retention and handling" as used herein can refer to recordkeeping regulations or citations in part or in whole and combinations thereof which are new or which have been updated in part or in whole or in combinations thereof within the twenty-four months prior to the regulatory retention plan creation date.

The term "non-USA based governmental citations" as used herein can refer to country laws for records retention, international organization records retention requirements, such as those of the European Union, and international association records retention requirements, such as the World Bank.

The term "non-verified existing compliance regulations for records retention and handling" as used herein can refer to recordkeeping regulations or citations in part or in whole and combinations thereof which have not been verified since being placed within the dynamic regulatory controls library.

The term "operational location" as used herein can refer to the physical address at which a business activity is occurring, such as Harris County, Texas.

The term "organization" as used herein can refer to a corporation, such as a company, a non-profit organization, an association, a partnership, a limited liability company, a governmental or quasi-governmental agency or another business entity, that has to comply with regulatory requirements.

The term "plan verified for compliance with regulations affecting the organization including regulations that have been revised within twenty-four months of a plan creation date" as used herein can refer to a plan that presents unambiguous guidance for the organization on recordkeeping requirements that comply with regulations as verified in the previous twenty-four months.

The term "record series" as used herein can refer to a group of records identified by a citation set using a client profile and the dynamic regulatory controls library.

The term "regulatory requirements" as used herein can refer to one or more specific in effect regulatory requirements that can be found in the rulemaking of governmental agencies relative to records retention, or records retention regulatory requirements as found in the code of federal regulations, US statutes, municipal codes, country regulations, state codes or codes of other such jurisdictions as the organization desires or is required to include in the scope of their records retention plan.

The following records retention regulations can be included within the definition of "regulatory requirements" namely records retention requirements which can include the regulatory requirements including but not limited to: (i) Safety and Environmental Management System II "Sems II", 30 U.S. Code of Federal Regulations, Part 250.1914, version year 2011; (ii) Oil Pollution Act Spill Prevention, Control and Countermeasure Plan "SPCC", 40 U.S. Code of Federal Regulations Part 112.7 version year 2009 as amended 2010; (iii) Clean Air Act Risk Management Programs, "RMP" 40 U.S. Code of Federal Regulations Part 68.200, version year 1996; (iv) Sarbanes-Oxley "SOX" 17 U.S. Code of Federal Regulations Part 210.2-06 version year 2003; (v) Occupational Safety and Health Standards, "OSHA" 29 U.S. Code of Federal Regulations, Part 1910.1020, version year 2011; and combinations thereof.

The term "retention event" as used herein can refer to a process step, circumstance, action or decision, and combinations thereof, which serve as a catalyst that causes a compliance rule or a compliance rule timeframe to initiate or to become instigated.

The term "revised compliance regulations for records retention and handling" as used herein can refer to compliance regulations that have been revised within twenty-four months of a creation date of the organization's records retention plan.

The term "selected retention period for each record series" as used herein can refer to the chronological duration chosen among the applicable regulatory recordkeeping requirements as the most appropriate for the record series. This selected retention period for each record series can be calculated for the citation set, which is applied to the record series, but it can also be calculated from business requirements if that duration is longer than the citation set calculation.

The term "source name" as used herein can refer to the entity or source document responsible for the record keeping citation or record keeping rule, such as the South Carolina Code of Laws.

The term "third party provider server" as used herein can refer to an information service, such as a computer that is controlled and maintained by a third party, such as the US Government Printing Office (GPO), which maintain sets of governmental citations, both USA based and Non-USA based, and maintain those citations as up to date by effective date of the citation, and which is in communication with the network. The third party provider server has a processor and data storage with the data storage containing the collection of citations from the various governmental entities. The third party provider can contain community promulgated citations. The citations can in fact, be governmental rules, such as state, local and federal governmental rules on records retention for a given geographic location and a given industry.

The term "USA based governmental citations" as used herein can refer to federal, state or local citations regarding records retention.

The term "validated citations" as used herein can refer to citations which have been validated using a third party provider.

The term "verified existing compliance regulations for records retention and handling" can refer to recordkeeping regulations or citations in part or in whole and combinations thereof which have been verified since being placed within the dynamic regulatory controls library.

Turning now to the Figures, FIG. 1A is an overview of the equipment usable to create an accelerated compliance plan with visual components using the computer instructions of the system.

FIG. 1A depicts an administrative processor 10 in communication with administrative data storage 11 connected to a network 12 to communicate with a plurality of client devices 14*a* and 14*b*.

Each client device 14*a* and 14*b* has a client device processor 16, client device data storage 18, and a client device display 20*a* and 20*b*.

The invention creates an accelerated compliance plan with a graphic visualization 6*a* as partially shown on client device display 20*a* for user 8, with a difference screen of the accelerated compliance plan with a graphic visualization 6*b* shown on client device display 20*b*.

The client devices 14a and 14b communicate through the network 12 to a third party provider server 54 having a third party processor 59 connected to the network 12 and to a third party data storage 55. The third party data storage contains validated citations 57.

FIG. 1B depicts a visual component for a client profile showing the total and relevant citations by jurisdiction from a formed or in process accelerated compliance plan created usable with the system.

The accelerated compliance plan with a graphic visualization 6a is created and presented on client device display 20a that is a jurisdiction citation summary for client profile "XYZ."

The total and relevant number of citations by jurisdiction is shown.

Pennsylvania abbreviated as "PA" and graphically depicts 78 citations while New Jersey abbreviated as "NJ" is at 23 citations.

The jurisdictions of the States of New York (NY), Texas (TX), Connecticut (CT), Alabama (AL) are shown as 84, 32, and 82 citations respectively. Additionally this visual presentation shows all United States Federal Citations (US FED) as 125 citations and all United Kingdom (UK) citations at 32 citations.

Figure 1C:
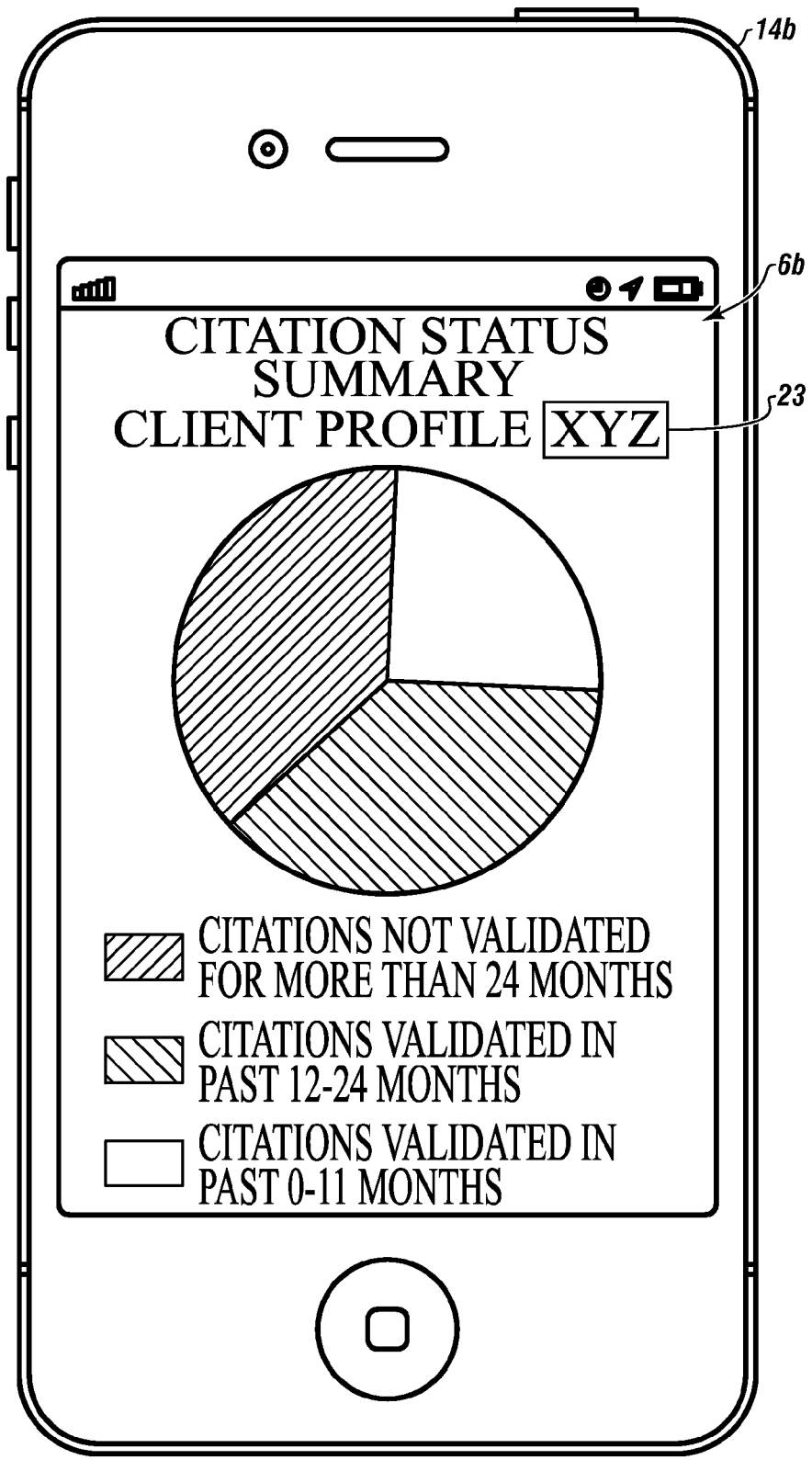
FIG. 1C depicts another exemplary visual component for a client profile of an accelerated compliance plan formed by the system showing a citation status summary for a client profile.

FIG. 1C depicts a visual component for a client profile 23 on client device 14b showing a citation status summary for the client profile "XYZ" created usable with the system.

The client profile 23 is formed using the computer instructions of the administrative data storage and is stored in the formed accelerated compliance plan with a graphic visualization 6b.

This client device, which is depicted in this FIG. 1C as a smart phone, shows the citations not validated for more than 24 months as a percentage of 100% of the citations and as a pie chart. The pie chart is the visual component. This pie chart depicts 33% invalid citations for easy recognition by an untrained user.

The visual component of the accelerated compliance plan with a graphic visualization 6b shows citations validated in the past 12-24 months as about 37% of the total number of citations for the client profile.

The visual component of the accelerated compliance plan with a graphic visualization 6b shows citations validated in the past 0-11 months at about 18% of the total on the pie chart as a visual component.

Figure 2:
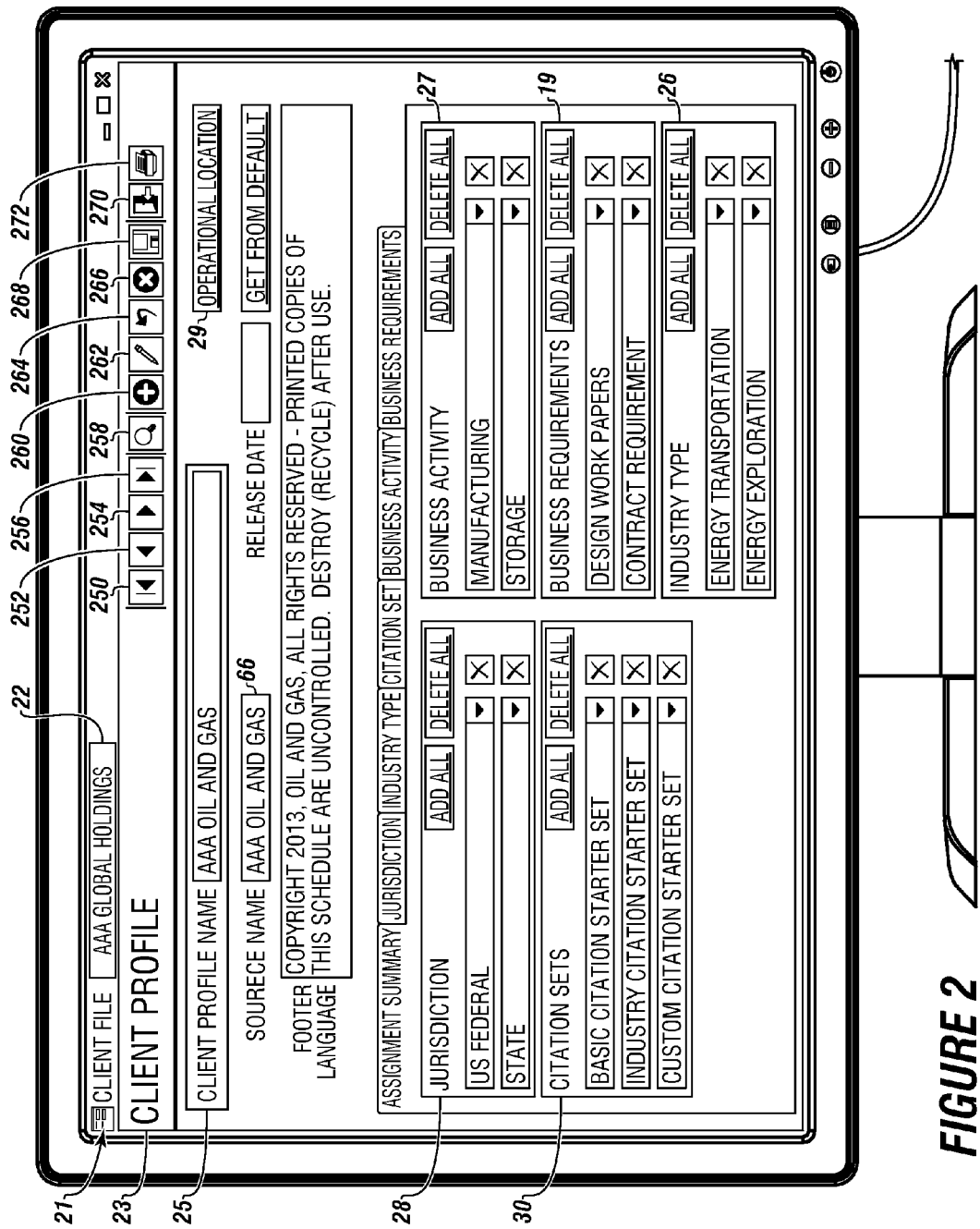
FIG. 2 is a screen shot depicting many of the dynamic editable fields of a client profile formed using the system of the invention.

FIG. 2 is a screen shot of dynamic editable fields of the client profile usable with the system.

The client profile 23 can be located in a client file 21. The client profile 23 is depicted having a plurality of dynamic editable fields.

The dynamic editable fields of the client profile 23 can include: a client profile name 25 shown as AAA Oil and Gas, a client file identifier 22, shown here as AAA Global Holdings, depicted as a company with many client profiles, of which AAA Oil and Gas is only one client profile according to embodiments.

The client profile can contain information that can be shown on multiple screens regarding jurisdiction in which the client profile operates, industry type of the client profile, citation sets applicable to the client profile, business activity for this client profile and business requirements for this client profile. Each field is a dynamic editable field populated using rules and computer instructions of the administrative data storage and content provided from either the client device the dynamic regulatory controls library or the dynamic records series library in the administrative data storage.

In one or more embodiments, an assignment summary screen can display all five components of the typical client profile.

The dynamic editable fields of the client profile 23 can include an industry type 26. For AAA Oil and Gas the industry type has been identified as energy transportation and energy exploration.

The dynamic editable fields of the client profile 23 can include a business activity 27 which is depicted for AAA Oil and Gas as manufacturing and storage.

The dynamic editable fields of the client profile 23 can include a jurisdiction 28 which is depicted for AAA Oil and Gas as United States Federal and State Jurisdictions. A client profile can also show particular states, such as Texas and Oklahoma in a subsequent screen of the client profile.

The dynamic editable fields of the client profile 23 can include an operational location 29 which is depicted for AAA Oil and Gas, once that button is connected, the various addresses of the operational locations are revealed in subsequent screens of the client profile. A visual map can be used to portray locations in embodiments.

The dynamic editable fields of the client profile 23 can include citation sets 30, such as for AAA Oil and Gas: a basic citation starter set, at least one industry citation starter set, and a custom citation starter set.

Client profiles can contain one starter set. The starter sets can be downloaded to the client profile from the dynamic regulatory controls library. The starter sets are computer determined using computer instructions which match a starter set to elements of the client profile that contain preset filters.

The client profile can include business requirements 19 which are depicted as design work papers and contract requirement.

The dynamic editable fields of the client profile 23 can include a source name 66 for AAA Oil and Gas. An example of a source name is shown as the Code of Federal Regulations.

Navigational buttons on the screen enable a user to navigate through the dynamic editable fields of the client profile.

Examples of the navigational buttons can be: a reverse button 252, a forward button 254, an add button 260, a delete button 266, and a save button 268.

Additional navigation buttons can be used and can include: a fast reverse button 250, a fast forward button 256, a search button 258, an edit button 262, an undo button 264, an exit button 270, and a print button 272.

FIG. 3A is a diagram of a portion of the dynamic regulatory controls library which resides in the administrative data storage.

The dynamic regulatory controls library 33 can include United States based record keeping rules 34 that can include federal government citations 35, state government citations 36, local government citations 37, and non-governmental United States record keeping standards 38 such as American Petroleum Institute standards.

The dynamic regulatory controls library 33 can include non-United States based record keeping rules 39 that can include non-United States country citations 40, international organization citations 41, such as International Maritime Association or the European Union, and non-governmental international record keeping standards 42, such as the International Organization for Standardization "ISO 9000" standards.

The dynamic regulatory controls library 33 can include citation starter sets 45 and basic citation starter sets 46.

In embodiments, basic citation starter sets 46 can be an "AFT"—accounting finance tax citation set 31, "HUM"— human resources citation set 32, "HSE"—health safety environment citation set 44, and "LEG"—legal citation set 49.

The dynamic regulatory controls library 33 can include industry citation starter sets 47.

In embodiments, the industry citation starter sets 47 can include oil and gas citation sets 53, software citation sets 56, healthcare citation sets 58, financial services citation sets 60, and manufacturing citation sets 62. Other industry specific sets can be included, such as a utilities citation set, a life sciences citation set, a pharmaceutical citation set, a retail citation set, and the like.

In embodiments, the citation starter sets 45 can also include custom citation sets 7.

Figure 3B:
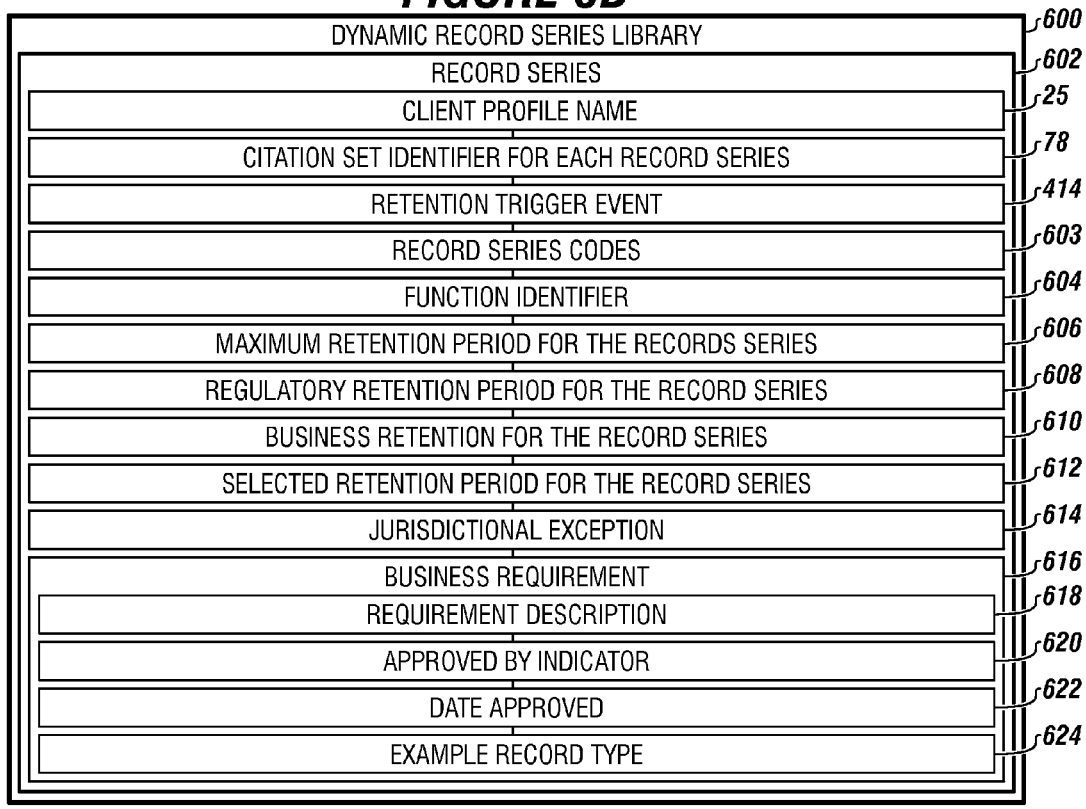
FIG. 3B is a diagram of a dynamic record series library usable with the system.

FIG. 3B is a diagram of a portion of the dynamic record series library.

The dynamic record series library 600 can have a plurality of record series 602.

Each record series 602 in the dynamic library 600 can also contain the client profile name 25, citation set identifier for each record series 78, a retention trigger event 414, and a plurality of record series codes 603.

Each record series can also contain a function identifier 604 to describe an operational function, a maximum retention period for the records series 606, a regulatory retention period for the record series 608, a business retention for the record series 610, a selected retention period for the record series 612, a jurisdictional exception 614 and a business requirement 616.

In embodiments, the business requirements 616 can include a requirement description 618, an approved by indicator 620, a date approved 622, and an example record type 624.

Figure 4:
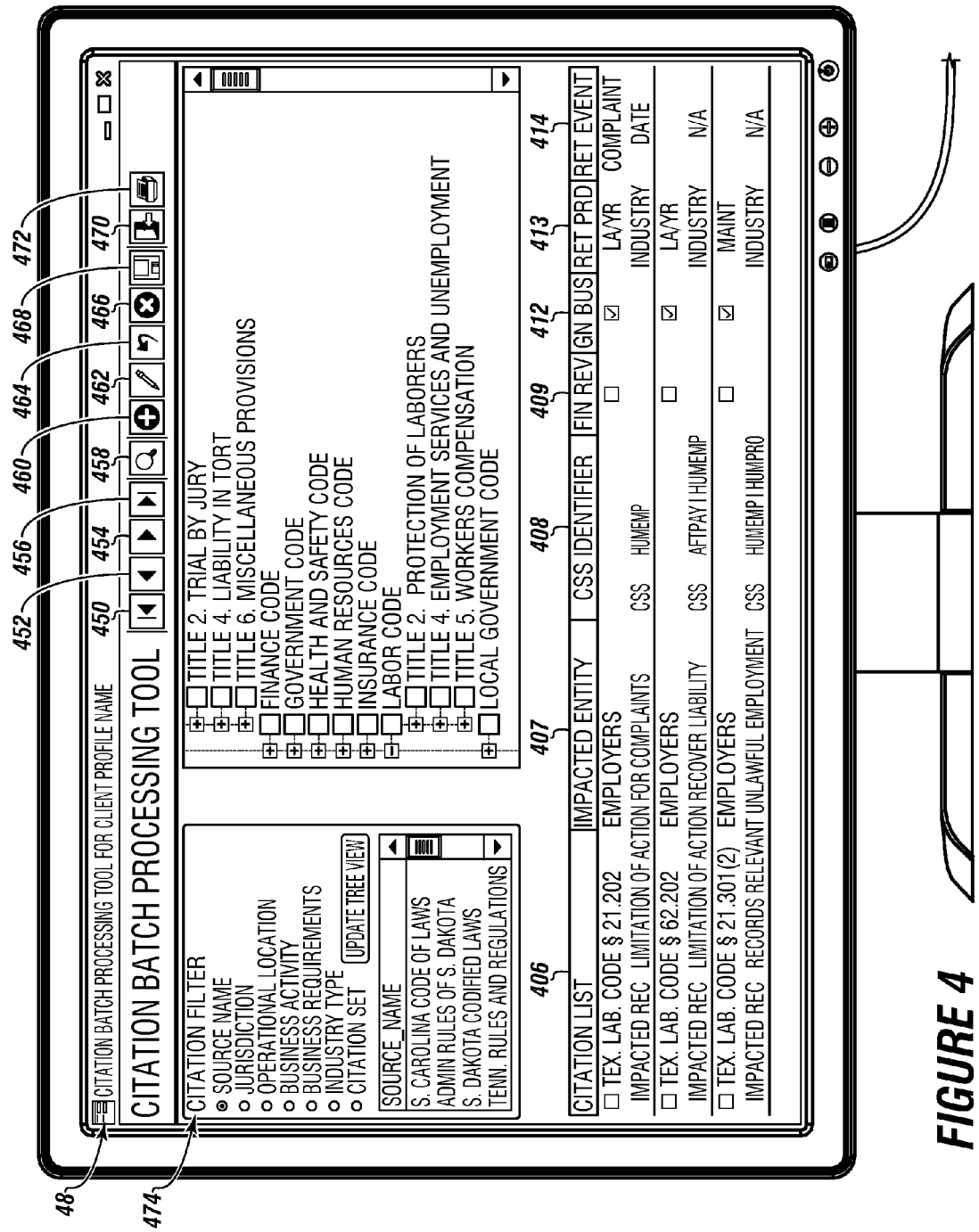
FIG. 4 is a screen shot of the fields produced by the computer instructions that form the citation batch processing tool according to the system.
Figure 5A:
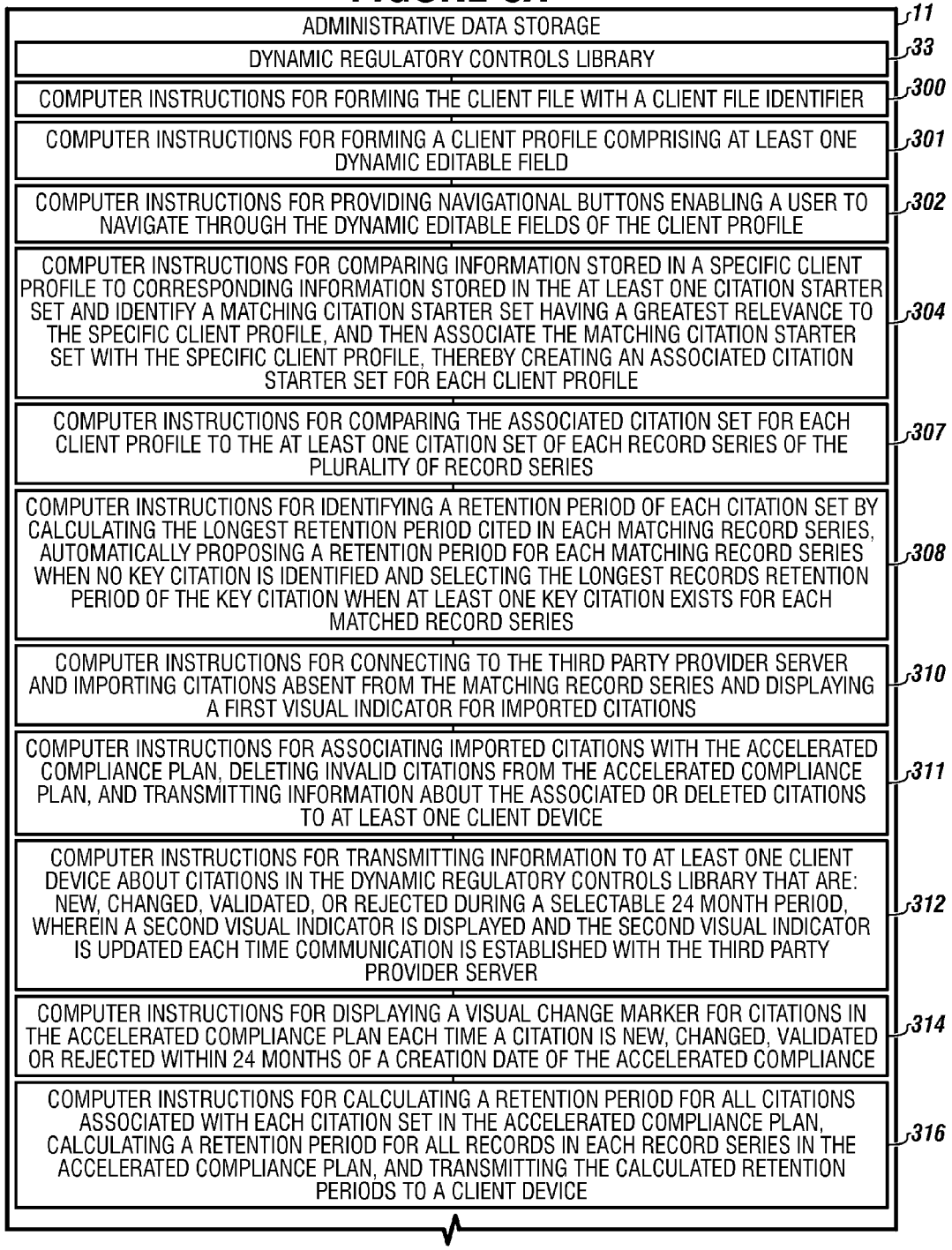
Figure 5D:
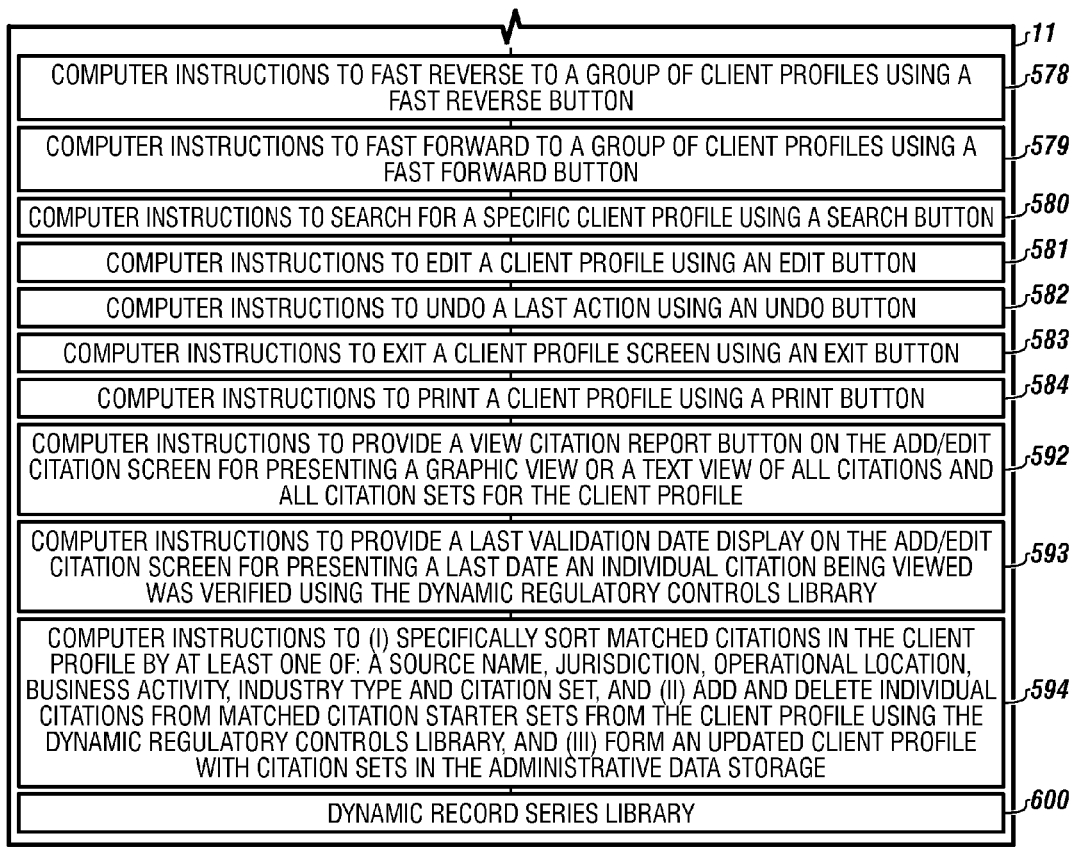

FIG. 4 is a screen shot of the fields produced by the computer instructions that form a citation batch processing tool usable with the system.

The citation batch processing tool 48 can have a citation filter 474.

The citation batch processing tool 48 can create a citation list 406 with an impacted entity 407. In this example, the citation list 406 includes three Texas Lab. Codes and the impacted entities are noted as employers for each of the citations of the citation list.

The citation batch processing tool 48 can provide at least one "CSS IDENTIFER" 408 or citation starter set identifier for each citation. For example for the Tex. Lab code 21.202 the impacted the starter set identified is the code HUMEMP which stands for Human Resources Employee Management.

The citation batch processing tool 48 can create a final review verification graphic "FIN REV" 409, which can include a check box graphic.

The citation batch processing tool 48 can create an indicator "GN BUS" 412 that an individual citation relates to general business and is not industry specific, which can include a check box graphic.

The citation batch processing tool 48 can calculate a retention period by citation "RET PRD" 413. As an example, for Tex. Lab Cod 21.202 the retention period is noted as LA1YR which stands for Labor Incident Year.

The citation batch processing tool 48 can identify a retention trigger event "RET EVENT" 414. For Tex. Lab Cod 21.202 the retention trigger event is noted as "complaint date."

The citation batch processing tool 48 can further contain a plurality of computer instructions in the administrative data storage to navigate citations and citation sets for the accelerated compliance plan using the batch processing tool and a client profile.

Navigational buttons on the screen enable a user to navigate through the citation batch processing tool 48.

Examples of the navigational buttons can be: a reverse button 452, a forward button 454, a citation button 460, a delete button 466, and a save button 468.

Additional navigation buttons can be used and can include: a fast reverse button 450, a fast forward button 456, a search button 458, an edit button 462, an undo button 464, an exit button 470, and a print button 472.

FIGS. 5A-5D is a diagram of the administrative data storage usable with the system.

The administrative data storage 11 can include the dynamic regulatory controls library 33

The administrative data storage 11 can include computer instructions 300 for forming the client file with a client file identifier.

The administrative data storage 11 can include computer instructions 301 for forming at least one client profile comprising at least one dynamic editable field.

The administrative data storage 11 can include computer instructions 302 for providing navigational buttons enabling a user to navigate through the dynamic editable fields of the client profile.

The administrative data storage 11 can include computer instructions 304 for comparing information stored in a specific client profile to corresponding information stored in the at least one citation starter set and identify a matching citation starter set having a greatest relevance to the specific client profile, and then associate the matching citation starter set with the specific client profile, thereby creating an associated citation starter set for each client profile.

The administrative data storage 11 includes computer instructions 307 for comparing the associated citation set for each client profile to the at least one citation set of each record series of the plurality of record series.

The administrative data storage 11 can include computer instructions 308 for identifying a retention period of each citation set by calculating the longest retention period cited in each matching record series, automatically proposing a retention period for each matching record series when no key citation is identified and selecting the longest records retention period of the key citation when at least one key citation exists for each matched record series.

The administrative data storage 11 can include computer instructions 310 for connecting to the third party provider server and importing citations absent from the matching record series and displaying a first visual indicator for imported citations.

The administrative data storage 11 can include computer instructions 311 for associating imported citations with the accelerated compliance plan, deleting invalid citations from the accelerated compliance plan, and transmitting information about the associated or deleted citations to at least one client device.

The administrative data storage 11 can include computer instructions 312 for transmitting information to at least one client device about citations in the dynamic regulatory controls library that are: new, changed, validated, or rejected during a selectable 24 month period, wherein a second visual indicator is displayed and the second visual indicator is updated each time communication is established with the third party provider server.

The administrative data storage 11 can include computer instructions 314 for displaying a visual change marker for citations in the accelerated compliance plan each time a citation is new, changed, validated or rejected within 24 months of a creation date of the accelerated compliance.

The administrative data storage 11 can includes computer instructions 316 for calculating a retention period for all citations associated with each citation set in the accelerated compliance plan, calculating a retention period for all records in each record series in the accelerated compliance plan, and transmitting the calculated retention periods to a client device.

The administrative data storage 11 can include computer instructions 318 for inserting a business requirement into the client profile.

The administrative data storage 11 can include computer instructions 320 for identifying United States based record keeping rules from at least one of: federal government citations, state government citations, local government citations, and non-governmental United States record keeping standards.

The administrative data storage 11 can include computer instructions 322 for identifying non-United States based record keeping rules from at least one of: non-USA country citations, international organization citations, non-governmental international record keeping standards from the dynamic regulatory controls library.

The administrative data storage 11 can include computer instructions 324 for forming a client profile additionally including at least one of: a facility type, an equipment type, a materials type, and an employee type.

The administrative data storage 11 can include computer instructions 326 for forming an accelerated compliance plan additionally including at least one of: a function code, a function title, a function description, and a reference for each record in a record series.

The administrative data storage 11 can include computer instructions 328 for providing for each record series at least one of: a business requirement indicator, a record type, a record series description, an "approved by" indicator, and a "date approved" indicator.

The administrative data storage 11 can include computer instructions 330 for forming a visual marker in the accelerated compliance plan indicating a duration for retaining each records series.

The administrative data storage 11 can include computer instructions 332 for providing a research analysis report with retention justification.

The administrative data storage 11 can include computer instructions 334 for providing records retention reports using the accelerated compliance plan.

The administrative data storage 11 can include computer instructions 336 for producing: a citation list with impacted entities identified, at least one citation starter set identifier for each citation, a final review verification graphic, an indicator that an individual citation relates to general business and is not industry specific, a retention period by citation, and a retention trigger event.

The administrative data storage 11 can include computer instructions 338 for navigation of the citation batch processing tool.

The administrative data storage 11 can include various computer instructions for navigation of the citation batch processing tool.

The administrative data storage 11 can include computer instructions 550 to fast reverse through a group of citations using a fast reverse button, computer instructions 552 to reverse through an individual citation using a reverse button, computer instructions 554 to forward to an individual citation using a forward button, computer instructions 556 to fast forward to a group of citations using a fast forward button, computer instructions 558 to search for a specific citation using a search button, computer instructions 560 to add a new citation using a citation button, computer instructions 562 to edit a citation using an edit button, computer instructions 564 to undo a last action using an undo button, computer instruction 566 to delete a citation using a delete button, computer instructions 568 to save work performed using a save button, computer instructions 570 to exit a screen using an exit button, and computer instructions 572 to print at least one of: a citation and a citation set using a print button.

The administrative data storage 11 includes computer instructions for navigating the record series for the accelerated compliance plan.

The computer instructions for navigating the record series can include: computer instructions 339 to reverse through a record series using a reverse button, computer instructions 340 to forward to a record in a record series using a forward button, computer instructions 341 to add a new record using a record button, computer instructions 342 to delete a record using a delete button, and computer instructions 343 to save work performed using a save button.

The computer instructions for navigating the record series can also include: computer instructions 344 to fast reverse through a group of records in a record series using a fast reverse button, computer instructions 345 to fast forward to a group of records in a record series using a fast forward button, computer instructions 346 to search for a specific record using a search button, computer instructions 347 to edit a record using an edit button, computer instructions 348 to undo a last action using an undo button, computer instructions 349 to exit a screen using an exit button, and computer instructions 350 to print at least one of: a record and a record series using a print button.

The administrative data storage 11 can include computer instructions creating navigational buttons enabling a user to navigate through the dynamic editable fields of the client profiles.

The computer instructions can include: computer instructions 573 to reverse to an individual client profile using a reverse button, computer instructions 574 to forward to an individual client profile using a forward button, computer instructions 575 to add a new client profile using an add button, computer instructions 576 to delete a client profile using a delete button, computer instructions 577 to save work performed using a save button, computer instructions 578 to fast reverse a group of client profiles using a fast reverse button, computer instructions 579 to fast forward to a group of client profiles using a fast forward button, computer instructions 580 to search for a specific client profile using a search button, computer instructions 581 to edit a client profile using an edit button, computer instructions 582 to undo a last action on a client profile using an undo button, computer instructions 583 to exit a client profile screen using an exit button, and computer instructions 584 to print a client profile using a print button.

The administrative data storage 11 can include computer instructions 592 to provide a view citation report button on the add/edit citation screen for presenting a graphic view or a text view of all citations and all citation sets for the client profile.

The administrative data storage 11 can include computer instructions 593 to provide a last validation date on the add/edit citation screen for presenting a last date an individual citation being viewed was verified using the dynamic regulatory controls library.

The administrative data storage 11 can include computer instructions 594 to (i) specifically sort matched citations in the client profile by at least one of: a source name, jurisdiction, operational location, business activity, industry type and citation set, (ii) add and delete individual citations from matched citation starter sets from the client profile using the dynamic regulatory controls library, and (iii) form an updated client profile with citation sets in the administrative data storage.

The administrative data storage 11 can include the dynamic record series library 600.

Figure 6:
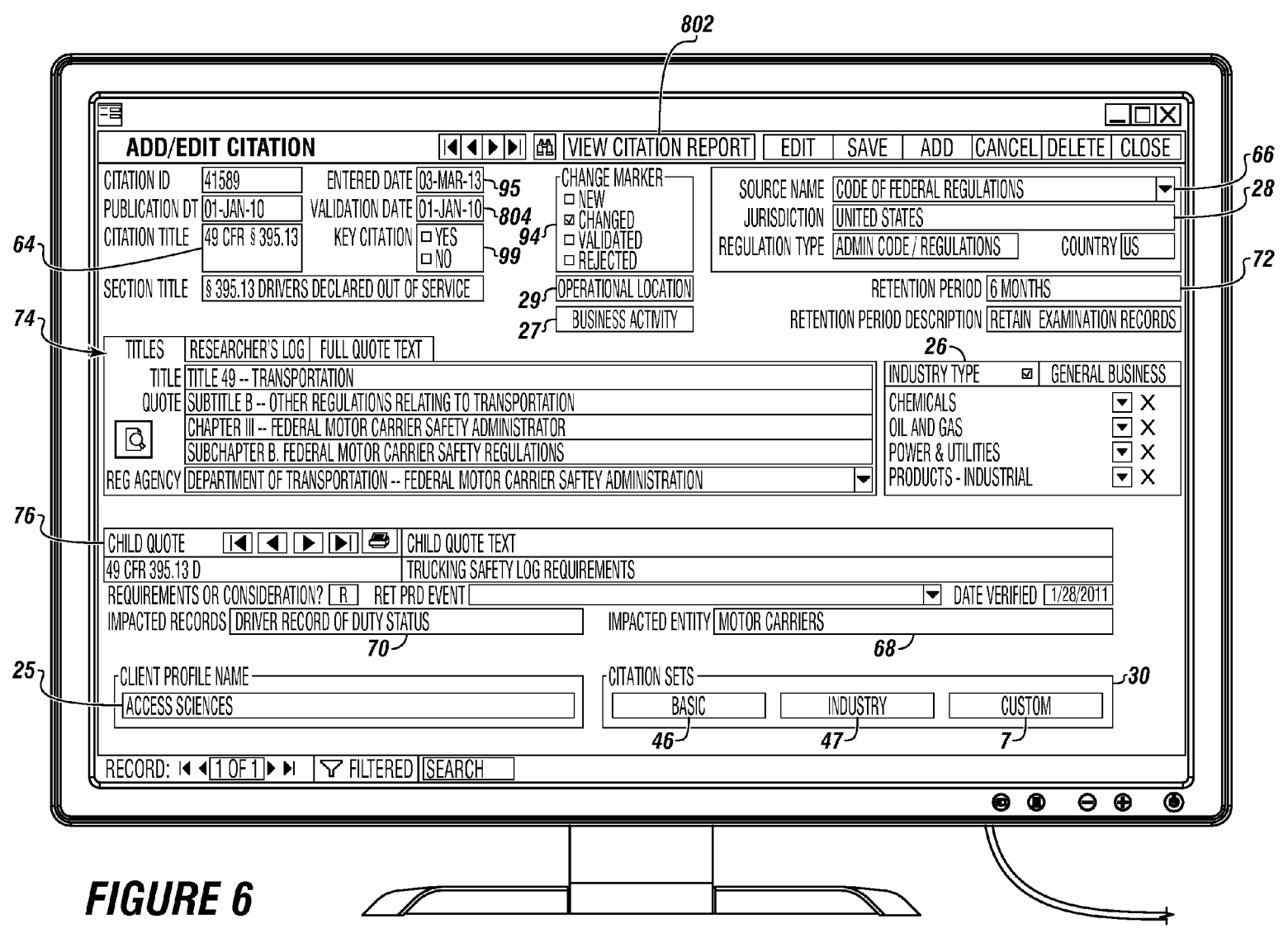

FIG. 6 depicts an add/edit citation set screen visually portraying many dynamic fields according to one or more embodiments.

The add/edit citation set screen which depicts the many dynamic fields used to create the accelerated compliance plan can be formed using the computer instructions in the administrative data storage and the button that connects to computer instructions to present the visual component.

Each citation can have a citation title 64, shown here as 49 CFR Section 395.13, a source name 66, shown here as the Code of Federal Regulations, an impacted entity 68, shown here as motor carriers, an impacted records 70, shown here as driver record of duty status, a retention period 72, shown here as six months, a full quote 74, shown here as titles with the details of the quote of the title indicated, a child quote 76, shown here as 49 CFR 395.13 D, a citation set 30, which displays the citation sets as basic 46, industry 47 or custom 7.

Each citation has an industry type 26, shown here as chemicals, oil and gas, power and utilities, and products—industrial, a jurisdiction 28, shown here as United States, a business activity 27, shown here as a button which can have a drop down selection of different business activities, an operational location 29 shown here as a button, which can have drop down selection to reveal different operational addresses, and a key citation indicator 99, shown here as a yes or no check box graphic to indicate that a key citation exists.

The client profile name 25, is shown here as Access Sciences, the entered date 95, is shown here as March 03, 2013 and the validation date 804, is shown here as January 01, 2010.

A visual change marker 94 is shown which reveals changes in citations in the accelerated compliance plan from the dynamic regulatory controls library.

The visual change marker 94 is used each time a citation is new, changed, validated or rejected within 24 months of creation date of the accelerated compliance plan as connections to the dynamic regulatory controls library are performed from the accelerated compliance plan.

The visual change marker 94 is identified in this Figure as "changed" being marked on the screen of the choices new, changed, validated, and rejected.

A view citation report button 802 is shown on the add/edit citation screen for presenting a graphic view or a text view of all citations and all citation sets for the client profile.

Figure 7:
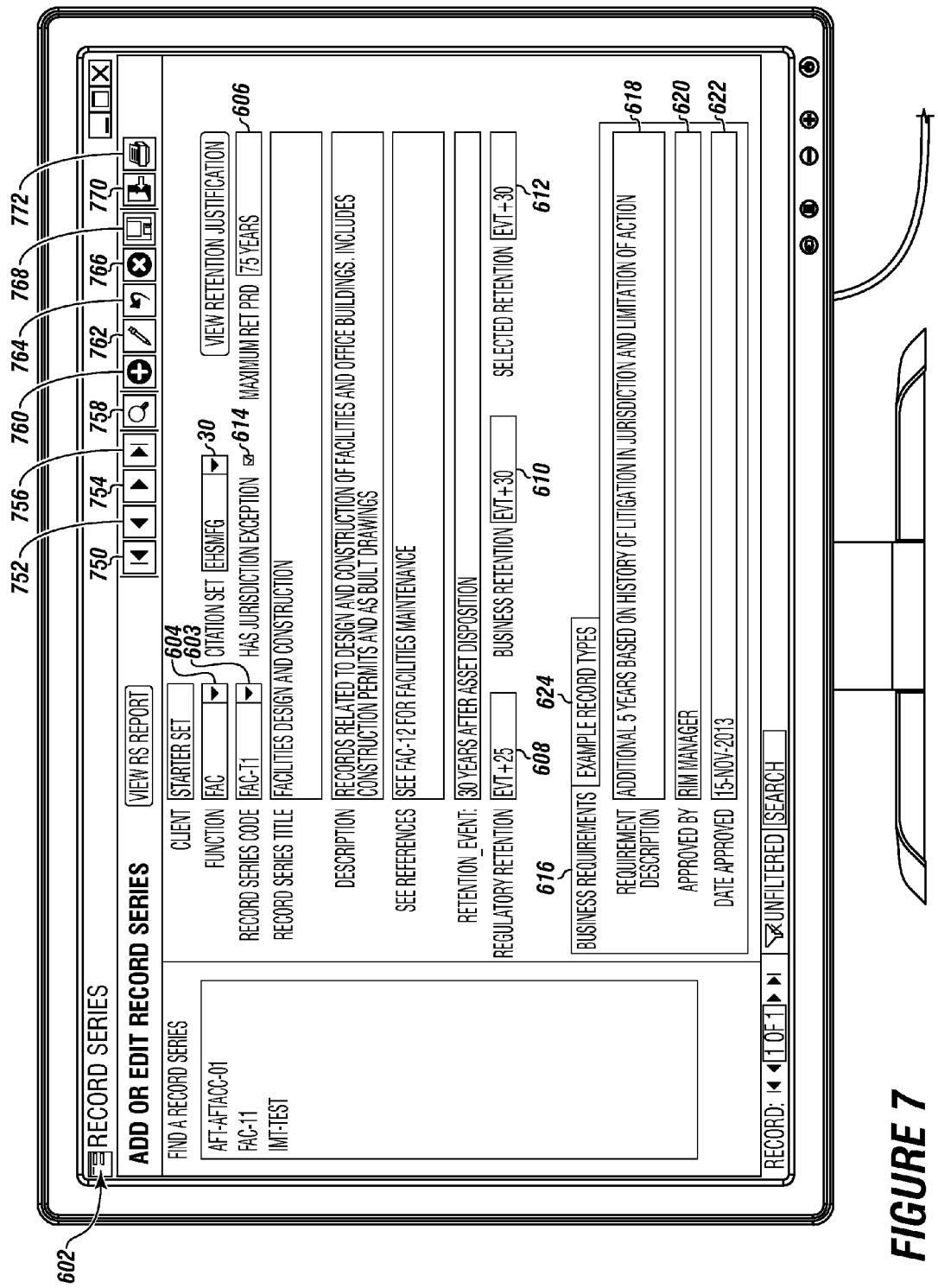
FIG. 7 depicts a records series screen visually portraying many dynamic fields according to one or more embodiments.

FIG. 7 depicts a records series screen visually portraying many dynamic fields according to one or more embodiments.

Each record series 602 can have a record series code 603, shown as FAC-T1, which stands for Finance Accounting and Controls Tax Records, a record series function 604, shown as FAC, and at least one citation set 30, shown as EHSMFG.

Each record of the record series 602 can have a maximum retention period 606, such as 75 years, a regulatory retention period 608, such as event plus 25 years, a business retention 610, such as event plus 30 years, a selected retention period 612, such as event plus 30 years, and a jurisdictional exception 614, such as marked with an "x" check box graphic which indicates the presence of a jurisdictional exception.

The business requirements 616 can include a requirement description 618, such as an additional 5 years based on history of litigation in jurisdiction and limitation of action, an approved by box 620, shown as RIM Manager, and a date approved 622, shown as Nov. 15, 2013.

This screen also has a tab for example record types 624 which pulls up a separate screen.

The record series can also include various navigational buttons enabling a user to navigate through the record series screen.

Examples of the navigational buttons can be: a reverse button 752, a forward button 754, a record button 760, a delete button 766, and a save button 768.

Additional navigation buttons can be used and can include: a fast reverse button 750, a fast forward button 756, a search button 758, an edit button 762, an undo button 764, an exit button 770, and a print button 772.

Figure 8:
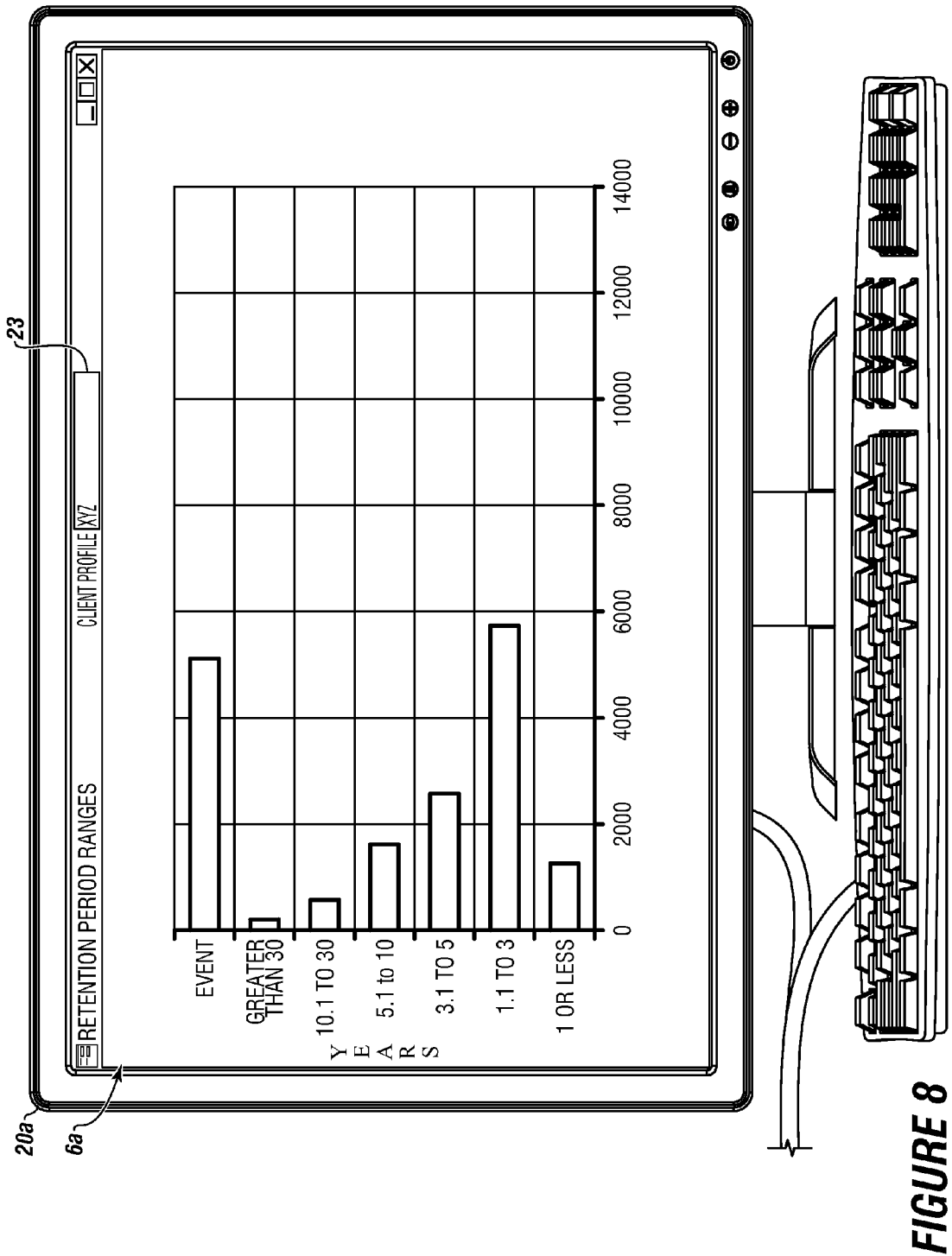
FIG. 8 is depicts a visual component of a formed or in process accelerated compliance plan created by the system that shows retention period ranges for a plurality of citation sets for a client profile.

FIG. 8 depicts a visual component of a formed or in process accelerated compliance plan that shows retention period ranges for a plurality of citations, citation sets, or record series for a client profile.

The accelerated compliance plan with a graphic visualization 6a is created and presented on client device display 20a for client profile 23 "XYZ."

The visual component displays retention period ranges identified as periods of years, shown here as 1 or less, 1.1 to 3, 3.1 to 5, 5.1 to 10, and greater than 30 years.

The visual component displays a visualization which is the number of event-based retention periods.

The visual component displays the number of citations, citation sets, or record series within the period of year ranges.

Figure 9:
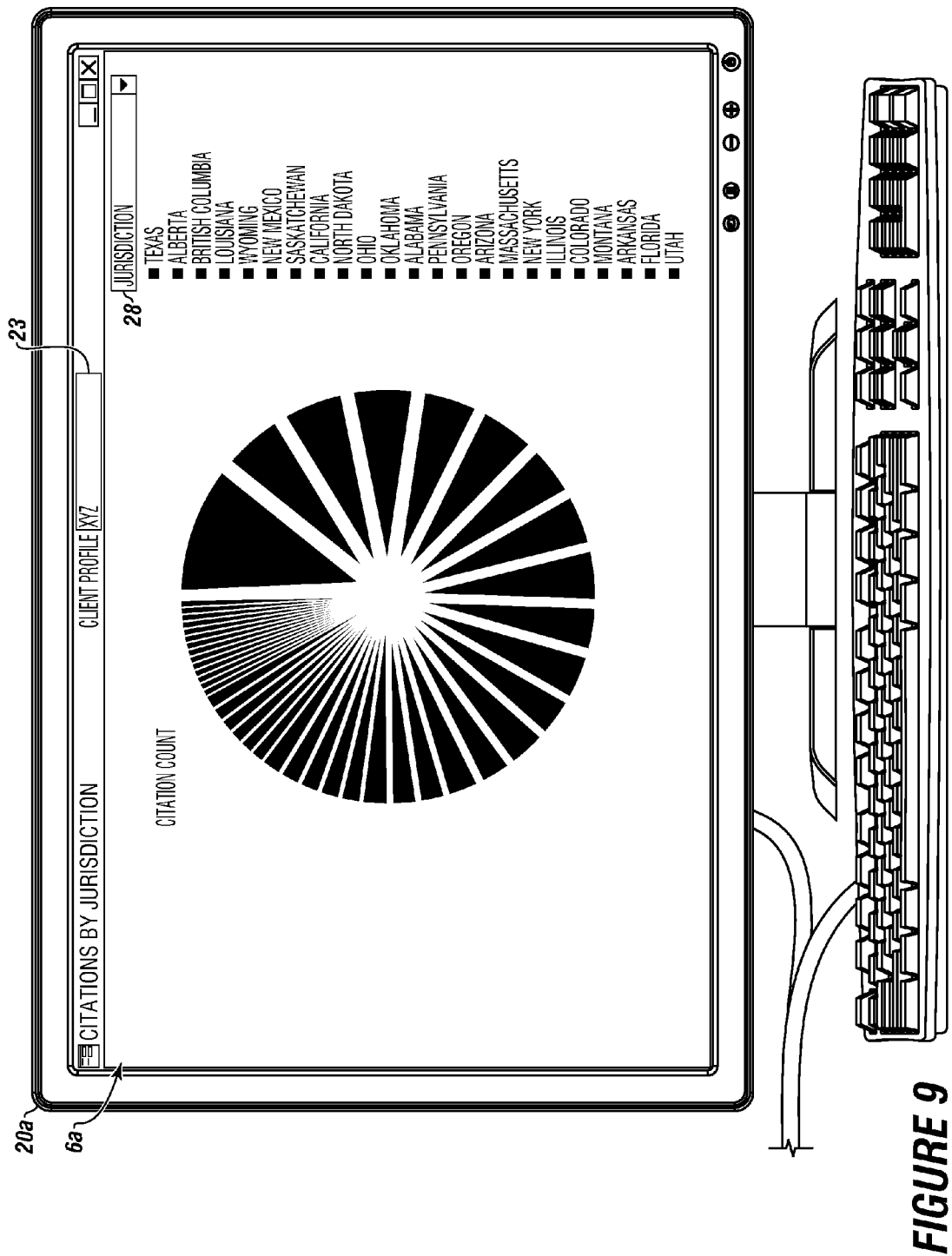
FIG. 9 depicts a visual component of a formed or in process accelerated compliance plan created by the system showing exemplary relevant citations by jurisdiction for a client profile.

Basic navigation buttons are displayed in the upper right hand corner of the screen FIG. 9 depicts a visual component of a formed or in process accelerated compliance plan showing exemplary relevant citations by jurisdiction for a client profile.

The accelerated compliance plan with a graphic visualization 6a is created and presented on client device display 20a for client profile 23 "XYZ."

The visual component has a descriptor of jurisdictions 28 for client profile 23.

The visual component has a pie chart showing the count and relative percentage of selected jurisdictions 28 based on the total citation count for client profile 23.

The jurisdictions are visualized in a tabular form, including Texas, Alberta, British Columbia, Louisiana, Wyoming, New Mexico and others.

Basic navigation buttons are displayed in the upper right hand corner of the screen.

Figure 10:
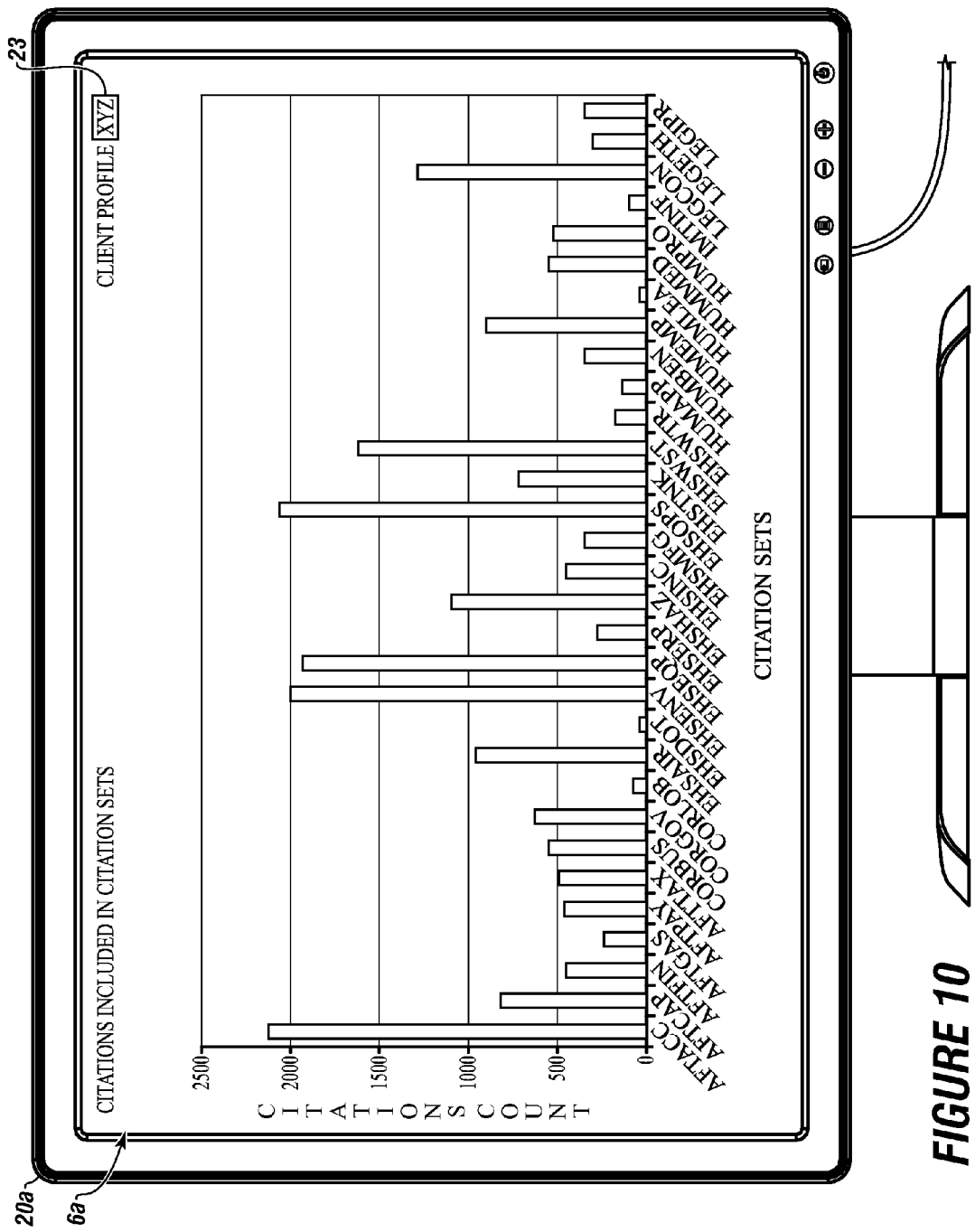
FIG. 10 depicts a visual component of a formed or in process accelerated compliance plan created by the system showing citations included within citation sets in a client profile.

FIG. 10 depicts a visual component of a formed or in process accelerated compliance plan with a graphic visualization 6a that shows a count of citations included within citation sets in a client profile.

The accelerated compliance plan with a graphic visualization 6a is created and presented on client device display 20a for client profile 23 "XYZ."

The visual component has a bar chart displaying citation sets, including AFTACC, AFTCAP, AFTFIN, AFTPAY, AFTTAX and others.

The visual component has a bar chart displaying citation sets plotted against the citation count.

While these embodiments have been described with emphasis on the embodiments, it should be understood that within the scope of the appended claims, the embodiments might be practiced other than as specifically described herein.

What is claimed is:

1. A computer system for forming an accelerated compliance plan with a graphic visualization, wherein the system comprises:

an administrative processor;
an administrative data storage in communication with the administrative processor;
a network in communication with the administrative processor;
a plurality of client devices, wherein each client device of the plurality of client devices comprises:
 a client device processor;
 a client device data storage in communication with the client device processor; and
 a client device display;
a third party provider server in communication with the network, wherein the third party provider server comprises:
 a third party processor;
 a third party data storage in communication with the third party processor; and
 a plurality of validated citations stored within the third party data storage;
a plurality of administrative computer instructions stored within the administrative data storage, wherein the administrative computer instructions instruct the administrative processor to:
 create a client file identifier;
 form at least one client profile associated with the client file identifier, wherein the client profile comprises at least one dynamic editable field;
 provide one or more navigational buttons that enable a user to navigate through the at least one dynamic editable field of the client profile;
a dynamic regulatory controls library stored within the administrative data storage comprising:
 a plurality of record keeping rules, wherein each record keeping rule of the plurality of record keeping rules is associated with a jurisdiction;
 at least one citation starter set comprising one or more citation sets;
wherein the administrative computer instructions instruct the administrative processor to:
 compare information stored in a specific client profile to corresponding information stored in the at least one citation starter set;
 identify a matching citation starter set having a greatest relevance to the specific client profile; and
 associate the matching citation starter set with the specific client profile, thereby creating an associated citation starter set for each client profile;
 a dynamic record series library stored within the administrative data storage, wherein the dynamic record series library comprises a plurality of record series, and further wherein each record series of the plurality of record series comprises:
  an operational function and at least one citation set;
wherein the administrative computer instructions instruct the administrative processor to:
 compare the associated citation set for each client profile to the at least one citation set of each record series of the plurality of record series;
 identify a matching record series with the greatest relevance to each client profile;
 associate the matching record series with each client profile; and
 create an accelerated compliance plan for each client profile, wherein the accelerated compliance plan for each client profile comprises:
  a client specific editable records retention plan based on the matching record series associated with the client profile;
wherein the administrative computer instructions instruct the administrative processor to:
 identify a retention period for each citation set associated with a accelerated compliance plan set by:
  when at least one key citation exists, selecting the longest records retention period of the at least one key citation for the matching record series; and
  when no key citation is exists, calculating the longest retention period for each citation set within the matching record series, and displaying the result;
wherein the administrative computer instructions instruct the administrative processor to:
 establish communication with the third party provider server;
 import citations absent from the matching record series; and
 display a first visual indicator for imported citations;
wherein the administrative computer instructions instruct the administrative processor to:
 associate imported citations with the accelerated compliance plan;
 delete invalid citations from the accelerated compliance plan;
 display the associated imported citations on at least one client device; and
 display the deleted invalid citations on at least one client device;
wherein the administrative computer instructions instruct the administrative processor to: display a second visual indicator for citations in the dynamic regulatory controls library that are: new, changed, validated, or rejected during a selectable 24 month period, wherein the second visual indicator is updated each time communication is established with the third party provider server;
wherein the administrative computer instructions instruct the administrative processor to: display a visual change marker for citations in the accelerated compliance plan each time a citation is new, changed, validated or rejected within 24 months of a creation date of the accelerated compliance;
wherein the administrative computer instructions instruct the administrative processor to: determine a calculated retention period for:
 all citations associated with each citation set in the accelerated compliance plan; and
 all records in each record series in the accelerated compliance plan; and
wherein the administrative computer instructions instruct the administrative processor to:
 display the calculated retention periods on a client device for accelerated compliance with record keeping rules in the accelerated compliance plan with graphic visualizations; and
 store the accelerated compliance plan for each client profile in the administrative data storage.

2. The system of claim 1, wherein the at least one dynamic editable field comprises:
 a client profile name;
 an industry type;
 a business activity;
 a jurisdiction;
 an operational location; or
 a business requirement.

3. The system of claim 2, further comprising a citation batch processing tool, wherein the citation batch processing tool comprises:
- a citation filter;
- computer instructions stored within the administrative data storage instructing the administrative processor to:
  - sort citations in each client profile by at least one of: the client profile name, the jurisdiction, the operational location, the business activity, the industry type, and the custom citation set;
  - modify an existing custom citation set with information from the dynamic regulatory controls library; and
  - form an updated client profile with the citation sets in the administrative data storage and then performing those functions on the client profile.

4. The system of claim 1, wherein the at least one citation starter set comprises a key citation.

5. The system of claim 1, wherein the at least one citation starter set comprises a plurality of citations, wherein each citation of the plurality of citations comprises at least one of:
- a citation title;
- a source name;
- an impacted entity;
- an impacted record;
- a retention period;
- a full quote;
- a child quote;
- a citation set code;
- an industry type;
- the jurisdiction;
- a business activity;
- an operational location;
- a basic citation starter set code or an industry specific citation starter set code; and
- a key citation indicator.

6. The system of claim 1, wherein the administrative computer instructions instruct the administrative processor to insert a business requirement into the client profile.

7. The system of claim 1, wherein the administrative computer instructions instruct the administrative processor to identify United States based record keeping rules from at least one of: federal government citations, state government citations, local government citations, or non-governmental United States record keeping standards.

8. The system of claim 1, wherein the administrative computer instructions instruct the administrative processor to identify non-United States based record keeping rules from at least one of: non-United States country citations, international organization citations, and non-governmental international record keeping standards from the dynamic regulatory controls library.

9. The system of claim 1, wherein the client profile further comprises at least one of: a facility type, an equipment type, a materials type, and an employee type.

10. The system of claim 1, wherein the accelerated compliance plan further comprises: a function code, a function title, a function description, and a reference for each record in the record series.

11. The system of claim 1, wherein each record series of the plurality of record series further comprises at least one of: a business requirement indicator, a record type, a record series description, an approved by indicator, and a date approved indicator.

12. The system of claim 1, wherein the administrative computer instructions instruct the administrative processor to form a visual marker in the client specific editable records retention plan indicating a duration for retaining each record series.

13. The system of claim 1, wherein the administrative computer instructions instruct the administrative processor to provide a research analysis report with a retention justification.

14. The system of claim 1, wherein the administrative computer instructions instruct the administrative processor to provide records retention reports using the client specific editable records retention plan.

15. The system of claim 1, wherein the administrative computer instructions instruct the administrative processor to produce at least one of:
- a citation list with impacted entities;
- at least one citation starter set identifier for each citation;
- a final review verification graphic;
- a retention period for a citation; and
- a retention trigger event.

16. The system of claim 15, further comprising computer instructions in the administrative data storage for navigating citations and citation sets for the client specific editable records retention plan using the citation set batch processing tool and a client profile, wherein the computer instructions comprise:
- computer instructions to reverse through an individual citation using a reverse button;
- computer instructions to forward to an individual citation using a forward button;
- computer instructions to add a new citation using a citation button;
- computer instructions to delete a citation using a delete button;
- computer instructions to save work performed using a save button; and
- at least one of:
  - computer instructions to fast reverse through a group of citations using a fast reverse button;
  - computer instructions to fast forward to a group of citations using a fast forward button;
  - computer instructions to search for a specific citation using a search button;
  - computer instructions to edit a citation using an edit button;
  - computer instructions to undo a last action using an undo button;
  - computer instructions to exit a screen using an exit button; and
  - computer instructions to print at least one of: a citation and a citation set using a print button.

17. The system of claim 16, further comprising a plurality of computer instructions in the administrative data storage for navigating the client profile using at least one of:
- computer instructions to reverse to an individual client profile using a reverse button;
- computer instructions to forward to an individual client profile using a forward button;
- computer instructions to add a new client profile using an add button;
- computer instructions to delete a client profile using a delete button;
- computer instructions to save work performed using a save button; and
- at least one of:
  - computer instructions to fast reverse to a group of client profiles using a fast reverse button;

computer instructions to fast forward to a group of client profiles using a fast forward button;

computer instructions to search for a specific client profile using a search button;

computer instructions to edit a client profile using an edit button;

computer instructions to undo a last action on a client profile using an undo button;

computer instructions to exit a client profile screen using an exit button; and computer instructions to print a client profile using a print button.

18. The system of claim 1, further comprising a basic citation starter set comprising at least one of: an accounting citation set, a finance tax citation set, a human resources citation set, a health safety environment citation set, and a legal citation set.

19. The system of claim 1, further comprising an industry starter citation starter set comprising at least one of: an oil and gas citation set, a software citation set, a healthcare citation set, a financial services citation set, and a manufacturing citation set.

20. The system of claim 1, further comprising in each record series, at least one of: a retention event, a client profile name, a maximum retention period for the records series, a regulatory retention period for the record series, a business retention for the record series, a selected retention period for the record series, a jurisdictional exception for the record series, and a business requirement for the record series.

21. The system of claim 20, wherein the business requirement further comprises at least one of: a requirement description, an approved by indicator, a date approved, and an example record type.

22. The system of claim 1, further comprising computer instructions in the administrative data storage for navigating the record series using:

computer instructions to reverse through a record series using a reverse button;

computer instructions to forward to a record in a record series using a forward button;

computer instructions to add a new record using a record button;

computer instructions to delete a record using a delete button;

computer instructions to save work performed using a save button; and and at least one of:

computer instructions to fast reverse through a group of records in a record series using a fast reverse button;

computer instructions to fast forward to a group of records in a record series using a fast forward button;

computer instructions to search for a specific record using a search button;

computer instructions to edit a record using an edit button;

computer instructions to undo a last action using an undo button;

computer instructions to exit a screen using an exit button; and computer instructions to print at least one of: a record and a record series using a print button.

23. The system of claim 1, further comprising computer instructions for providing a view citation report button on an add/edit citation screen formed in the accelerated compliance plan for presenting a graphic view or a text view of all citations and all citation sets for a selected client profile.

24. The system of claim 22, further comprising computer instructions providing a last validation date display on the add/edit citation screen for presenting a last date an individual citation being viewed for the selected client profile was verified using the dynamic regulatory controls library.

* * * * *